(12) United States Patent
Gburzynski et al.

(10) Patent No.: US 12,457,498 B2
(45) Date of Patent: **\*Oct. 28, 2025**

(54) CAPSULE MIGRATION IN A FLEXIBLE SOFTWARE-DEFINED RADIO ACCESS NETWORK ARCHITECTURE AND METHODS FOR USE THEREWITH

(71) Applicants: ISRD Sp. z o.o., Piaseczno (PL); ISN Sp. z o.o., Piaseczno (PL)

(72) Inventors: Hubert Gburzynski, Sochocin (PL); Robert Gdowski, Warsaw (PL); Adam Dawid Flizikowski, Bydgoszcz (PL); Farinaz Kooshki, Piaseczno (PL); Md Munjure Mowla, Rajshahi (BD); Maria Safianowska, Warsaw (PL); Slawomir Pietrzyk, Piaseczno (PL)

(73) Assignees: ISRD Sp. z o.o., Piaseczno (PL); ISN Sp. z o.o., Piaseczno (PL)

( \* ) Notice: Subject to any disclaimer, the term of this patent is extended or adjusted under 35 U.S.C. 154(b) by 0 days.

This patent is subject to a terminal disclaimer.

(21) Appl. No.: 19/095,690

(22) Filed: Mar. 31, 2025

(65) Prior Publication Data
US 2025/0227474 A1   Jul. 10, 2025

Related U.S. Application Data

(63) Continuation of application No. 18/823,035, filed on Sep. 3, 2024, now Pat. No. 12,356,196, which is a
(Continued)

(51) Int. Cl.
*H04W 12/122* (2021.01)
*H04L 41/5003* (2022.01)

(52) U.S. Cl.
CPC ....... *H04W 12/122* (2021.01); *H04L 41/5003* (2013.01)

(58) Field of Classification Search
CPC .................. H04W 12/122; H04L 41/5003
See application file for complete search history.

(56) References Cited

U.S. PATENT DOCUMENTS

| 2013/0039355 A1* | 2/2013 | de la Garrigue ....... H04W 4/80 370/338 |
| 2017/0013473 A1* | 1/2017 | Puthenpura ........... H04W 24/02 |

(Continued)

OTHER PUBLICATIONS

D'Oro et al. ("OrchestRAN: Network Automation through Orchestrated Intelligence in the Open RAN", May 2022, IEEE Conference on Computer Communications, pp. 270-279 (Year: 2022).*
(Continued)

*Primary Examiner* — Kenneth W Chang
(74) *Attorney, Agent, or Firm* — Katz Ruby & Carle LLP; Katherine C. Stuckman; Bruce E. Stuckman

(57) ABSTRACT

A radio access network (RAN) system comprises capsules that operate in parallel to cooperatively perform RAN stack operations, each capsule utilizing a processor and a memory configured to perform a corresponding component of the RAN stack operations, wherein a first subset of plurality of capsules is implemented by a first module under control of a first liquidity controller, wherein a second subset of capsules is implemented by a second module under control of a second liquidity controller, wherein the first subset of capsules are mutually exclusive of the second subset of capsules, wherein the first liquidity controller and the second liquidity controller cooperate to support a migration of a first capsule from the first subset of capsules to the second subset of capsules.

20 Claims, 24 Drawing Sheets

Related U.S. Application Data continuation-in-part of application No. 18/395,970, filed on Dec. 26, 2023.

(60) Provisional application No. 63/581,363, filed on Sep. 8, 2023.

(56) References Cited

U.S. PATENT DOCUMENTS

| | | | |
|---|---|---|---|
| 2017/0079059 A1* | 3/2017 | Li | H04W 16/02 |
| 2021/0409977 A1 | 12/2021 | Dussmann et al. | |
| 2022/0116335 A1* | 4/2022 | Sharma Banjade | H04W 24/02 |
| 2022/0232423 A1* | 7/2022 | Thyagaturu | H04W 28/10 |
| 2022/0330264 A1 | 10/2022 | Bhaskaran et al. | |
| 2023/0049843 A1 | 2/2023 | Mishra et al. | |

OTHER PUBLICATIONS

International Searching Authority; International Search Report and Written Opinion; International Application No. PCT/US2024/045099; Feb. 9, 2025; 13 pgs.

O-RAN Working Group 1 (Use Cases and Overall Architecture) O-RAN Architecture Description, ORAN.WG1.OAD-R003-v10.00, Jul. 27, 2023; pp. 8-23; Fig 5.1-2.

\* cited by examiner

301

401

520

601

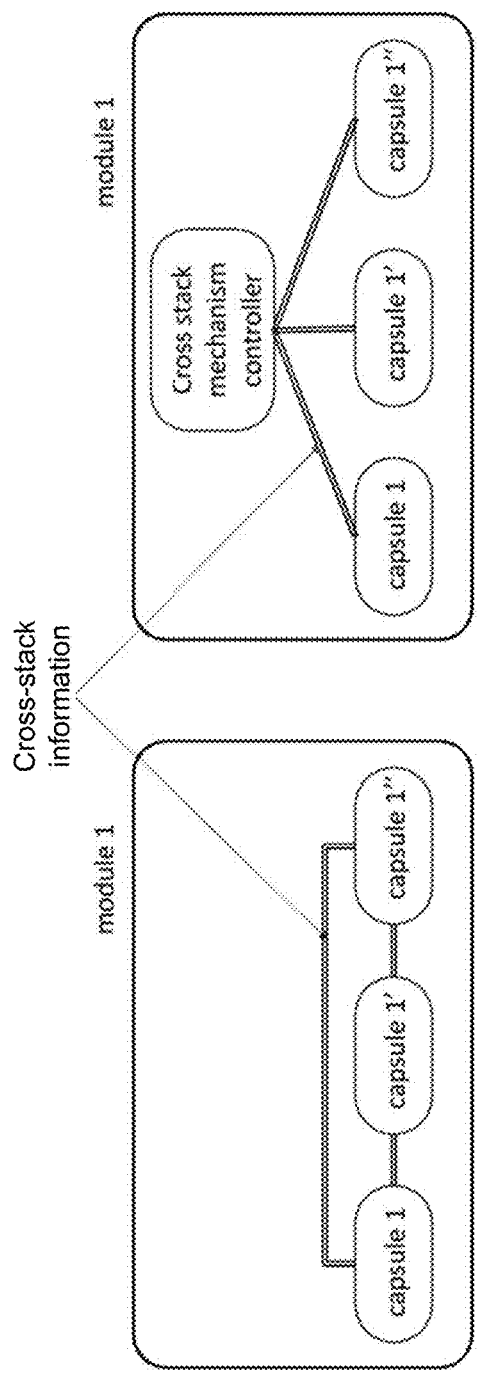
FIG. 6B
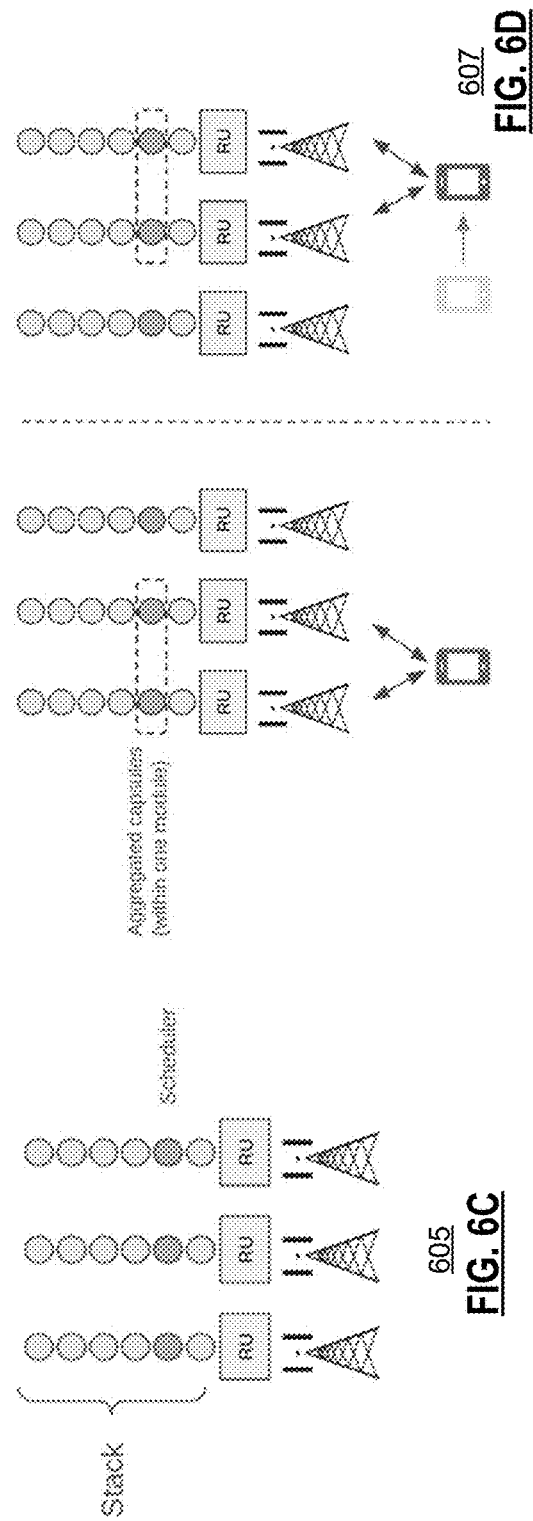
FIG. 6C
FIG. 6D

609

611

620

701

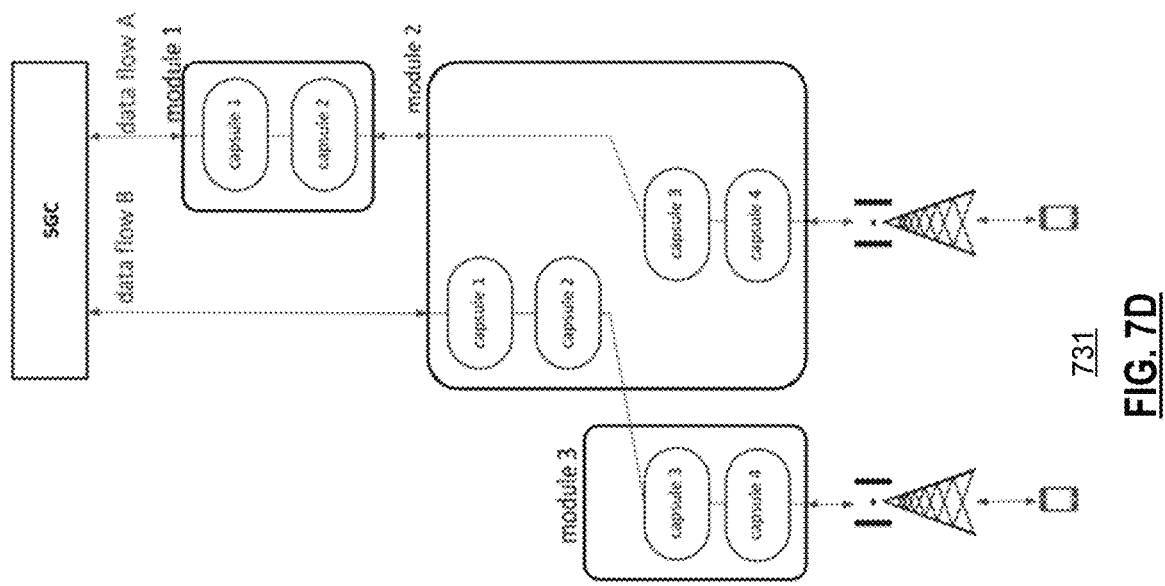
FIG. 7D
731
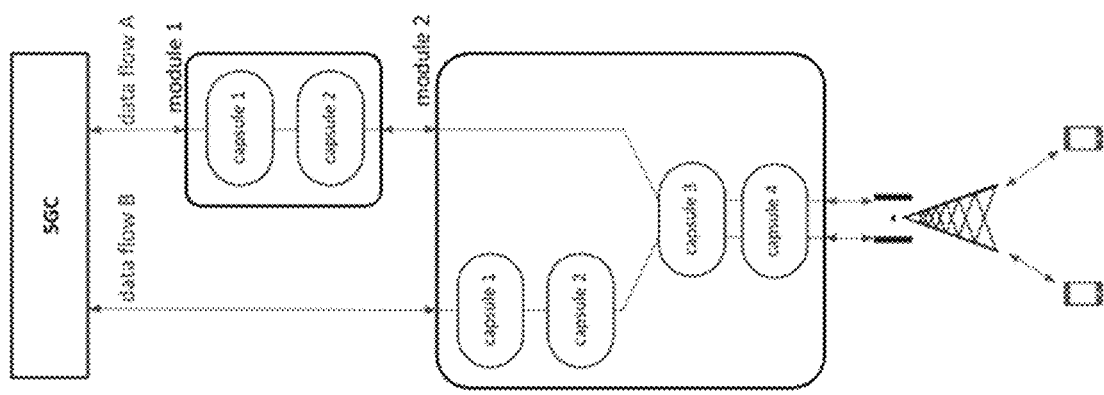
FIG. 7C
721
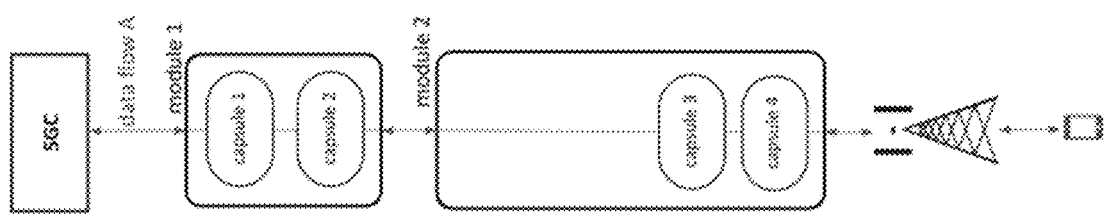

741

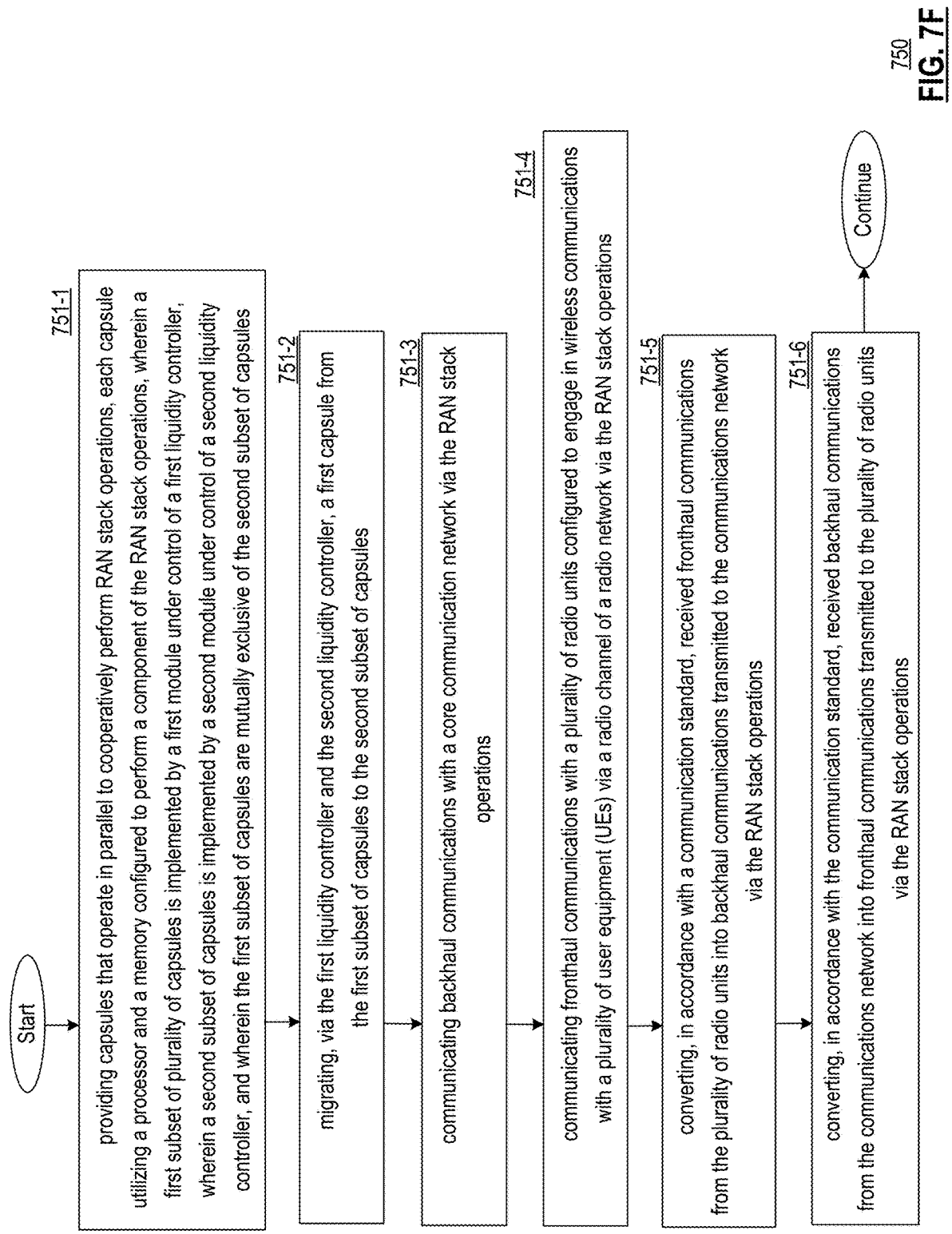

801

921

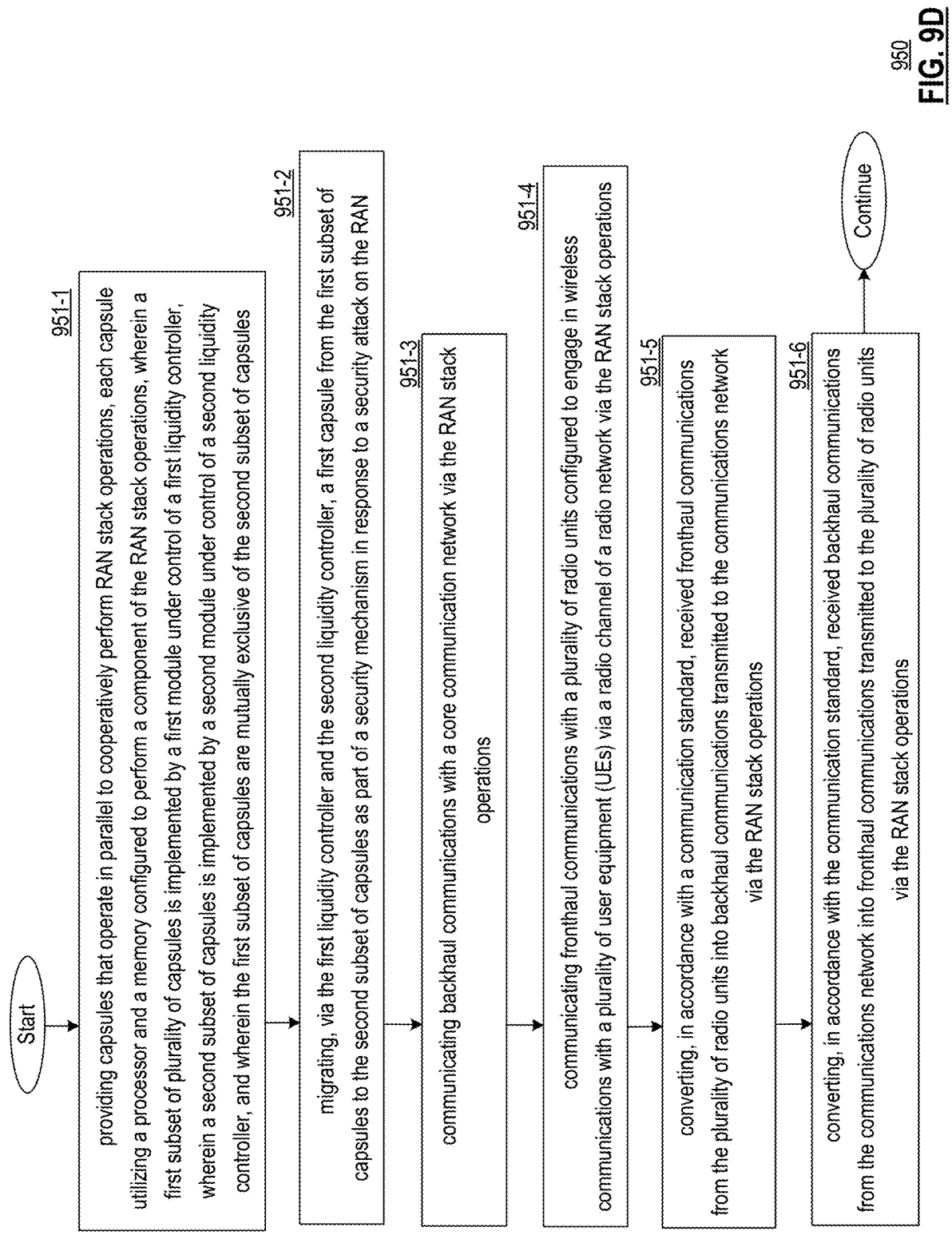

CAPSULE MIGRATION IN A FLEXIBLE SOFTWARE-DEFINED RADIO ACCESS NETWORK ARCHITECTURE AND METHODS FOR USE THEREWITH

CROSS-REFERENCE TO RELATED APPLICATIONS

The present U.S. Utility patent application claims priority pursuant to 35 U.S.C. § 120 as a continuation of U.S. Utility application Ser. No. 18/823,035, entitled "SECURITY IN A FLEXIBLE SOFTWARE-DEFINED RADIO ACCESS NETWORK ARCHITECTURE AND METHODS FOR USE THEREWITH", filed Sep. 3, 2024, which is a continuation-in-part of U.S. Utility application Ser. No. 18/395,970, entitled "FLEXIBLE SOFTWARE-DEFINED RADIO ACCESS NETWORK ARCHITECTURE AND METHODS FOR USE THEREWITH", filed Dec. 26, 2023, which claims priority pursuant to 35 U.S.C. § 119 (e) to U.S. Provisional Application No. 63/581,363, entitled "FLEXIBLE SOFTWARE-DEFINED RADIO ACCESS NETWORK ARCHITECTURE AND METHODS FOR USE THEREWITH", filed Sep. 8, 2023, all of which are hereby incorporated herein by reference in their entirety and made part of the present U.S. Utility patent application for all purposes.

FIELD OF THE DISCLOSURE

The subject disclosure relates to implementation and control of wireless communication networks.

BRIEF DESCRIPTION OF THE DRAWINGS

Reference will now be made to the accompanying drawings, which are not necessarily drawn to scale, and wherein:

FIGS. 6A-6F are schematic/block diagrams illustrating non-limiting examples of RAN stack instance cooperation in accordance with various aspects described herein.

FIGS. 7C-7E are schematic/block diagrams illustrating non-limiting examples of capsule migration in accordance with various aspects described herein.

FIG. 7F is a flow diagram illustrating a non-limiting example of a method in accordance with various aspects described herein.

FIG. 9D is a flow diagram illustrating a non-limiting example of a method in accordance with various aspects described herein.

DETAILED DESCRIPTION

Figure 1A:
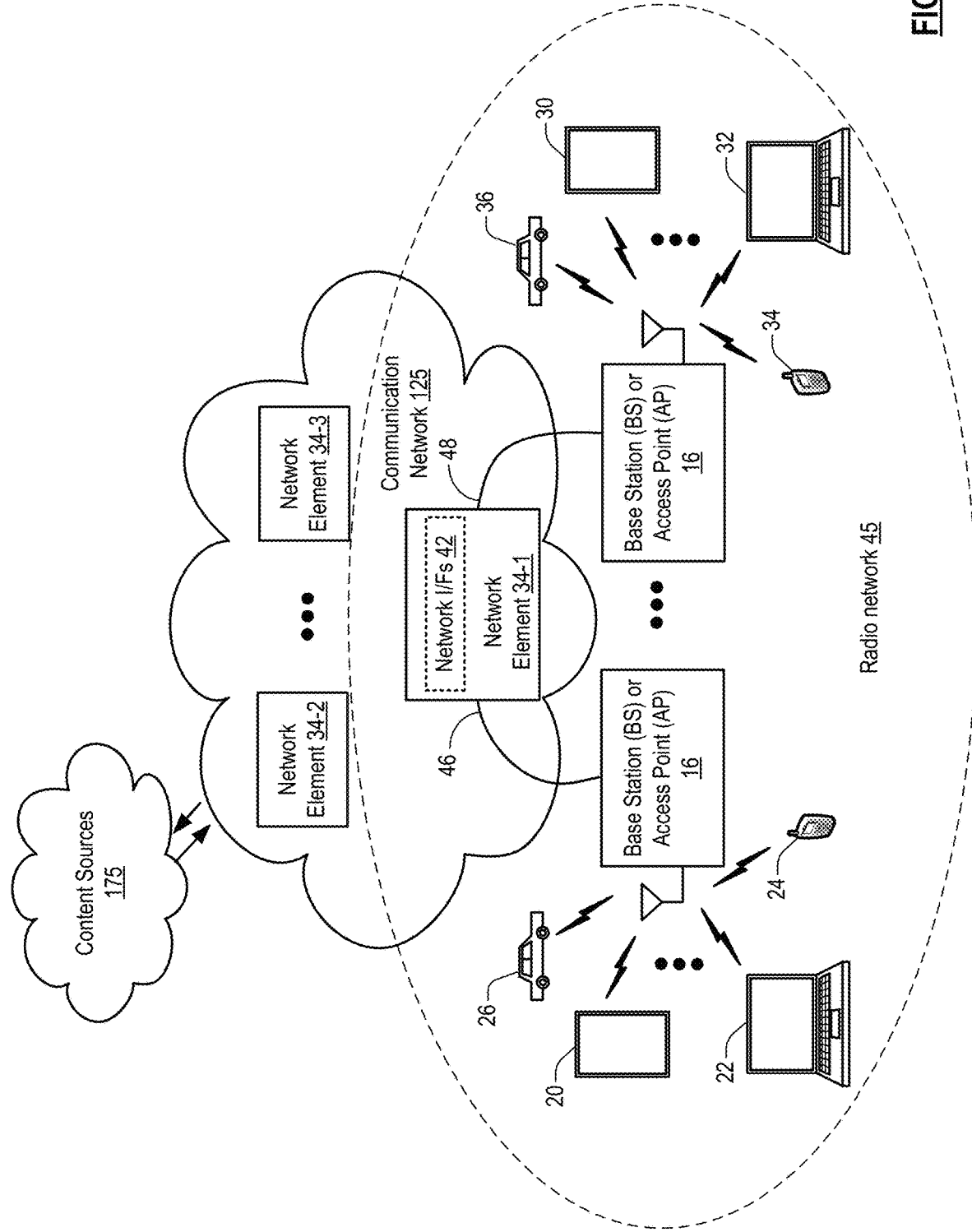
FIG. 1A is a schematic/block diagram illustrating a non-limiting example of a communications network in accordance with various aspects described herein.

One or more examples/embodiments are now described with reference to the drawings, wherein like reference numerals are used to refer to like elements throughout. In the following description, for purposes of explanation, numerous details are set forth in order to provide a thorough understanding of the various examples. It is evident, however, that the various examples can be practiced without these details (and without applying to any particular network environment or standard).

Referring now to FIG. 1, a schematic/block diagram is shown illustrating an example, non-limiting example of a communications network 125, such as a core communications network or other wide area network in accordance with various aspects described herein. In particular, the communications network 125 includes a plurality of network elements 34, such as network elements 34-1, 34-2 and 34-3 that are shown.

In various examples, the network elements 34 are interconnected via transport links that can be wired, optical and/or wireless links that, for example, support encapsulated and encrypted transport. The network elements 34 can be implemented, for example, with the use of radio access network (RAN) controllers, RAN intelligent controllers (RIC) either non-real time, near real time or real time, programmable switches, edge servers, soft switches, network gateways, media distribution hubs, and/or other routers, edge devices, switches or network nodes and combinations thereof that themselves can be implemented via special purpose hardware, and/or via general purpose hardware computing programmed to perform their respective functions.

The communications network 125 operates to support communications including communications via the radio access network 45. In operation, the communication network 125 transports data received from content sources 175 or other data content transport clients, and/or data conveying other communications between wireless communication devices. This data can include, e.g., voice and other audio, video, graphics, text or other media, applications control information, billing information, network management information and/or other data. The core communication network 125 also operates to manage access by the wireless communication devices, provides billing and network management and supports other network functions.

The wireless communication devices include tablets 20 and 30, laptops 22 and 32, mobile phones 24 and 34, vehicles 26 and 36 and/or other fixed or mobile communication devices. The wireless communications can include signals formatted in accordance with 3GPP, long term evolution (LTE) 4G, 5G, other orthogonal frequency division multiple access (OFDMA) protocols and/or other wireless signaling. These wireless communications devices can be referred to as client devices or user equipment (UEs), regardless of the particular standard used to communicate with these particular devices.

The wireless communication devices communicate with base station or access points 16 to receive services from the communication network 125. Typically, base stations are used for cellular telephone systems and like-type systems, while access points are typically used for in-home or in-building wireless networks. For direct connections (i.e., point-to-point communications), wireless communication devices communicate directly with the BS or AP 16 via an allocated channel, time slot and/or other physical resource block (PRB) of a radio channel serviced by a plurality of radio units (RUs) that operate in conjunction with baseband processing to convert communications from the communications network 125 into wireless communications of the radio access network 45 and vice versa. Regardless of the particular type of communication system, each wireless communication device also includes, or is coupled to, a corresponding radio configured for wireless communications via the radio access network 45.

In the example shown, the network element 34-1 includes an edge server, radio access network intelligent controller and/or other network element or elements having a plurality of network interfaces (I/Fs) 42. The plurality of network interfaces (I/Fs) 42 can include a wide area network interface for operating over one or more backhaul links with other network elements 34 operating to support data transport. In addition, the network interfaces (I/Fs) 42 can support communications with other network elements 34 operating other portions of the radio access network 45. The plurality of network interfaces 42 can further support a plurality of other links 46 and 48, for upstream and downstream communication with a plurality of wireless communications devices over the radio access network 45 via base station (BS) or access points (AP) 16. For example, the network interfaces 42 can include a core network interface configured to communicate network communications with one or more network elements 34 of a core communication network, and a radio network interface configured to communicate communications BS or APs 16 of the radio access network 45. These interfaces 42 can operate via F1, E2, evolved packet core (EPC), next generation core (NGC), 5G core or via another network protocol or standard. The network element 34-1 can also include a cooperative radio resource manager or other radio resource manager that operates to support resource management of the radio access network 45 including load control and power control, and/or admission control, packet scheduling, hand-over control, and/or other user plane and control plane functions of a radio network controller/radio access network intelligent controller, etc.

In addition or in the alternative, the network element 34-1 and BS or AP 16 can be implemented in conjunction with an open radio access network (O-RAN) or other standard that is based on interoperability and standardization of RAN elements and includes a unified interconnection standard for white-box hardware and open source software elements from different vendors to provide an architecture that integrates a modular base station software stack on off-the-shelf hardware which allows baseband and radio unit components from discrete suppliers to operate seamlessly together. For example, the network element 34-1 can include a packet processing function (PPF) which contains user-plane functions that are asynchronous to the Hybrid Automatic Repeat Request (HARQ) loop, and includes the Packet Data Convergence Protocol (PDCP) layer—such as encryption—and the multipath handling function for the dual connectivity anchor point and data scheduling and/or a radio control function (RCF) that handles load sharing among system areas and different radio technologies, as well as the use of policies to control the schedulers in the RPFs and PPFs. At the user and bearer level, the RCF can, for example, operate to negotiate QoS and other policies with other domains and is responsible for the associated service level agreement (SLA) enforcement in the RAN and/or to control the overall RAN performance relative to the service requirement, creates and manages analytics data, and the RAN self-organizing network (SON) functions.

While the BS or APs 16 are shown schematically as if having a single antenna, the BS or APs 16 each include a plurality of RUs (each with one or more antennas) that are supported by baseband processing via a combination of distributed units (DU) and centralized units (CU). In various examples, CUs, DUs and RUs communicate control plane and user plane signaling from the UEs to the core network. The CUs/DUs/RUs operate in conjunction with a radio access network protocol stack (that can be called more simply a "RAN stack" or "radio stack") that can include, for example, a physical (PHY) layer, media access control (MAC) layer, radio link control (RLC) layer and one or more upper layers such as a Packet Data Convergence Protocol (PDCP) layer and/or a service data adaptation protocol (SDAP) layer, and/or other layers, etc. that also can be referred to as RAN stack components.

The network element 34-1 and BS or AP 16 can cooperate and operate in an architecture where the baseband processing via the DU/CU combination supports a plurality of RUs with, for example, multiple DUs attaching to a single CU and/or multiple RUs attaching to single DU. In particular, a flexible SD-RAN software (SW) architecture is implemented via or in conjunction with one or more RUs/DUs/CUs in the BS or AP 16 or the network element 34-1. Base station elements, including the DUs and CUs can be collocated in a BS or AP 16 with multiple RUs—but they do not have to be collocated. In addition or in the alternative, the CU alone or the CUs and DUs can be implemented in network element 34-1. In this case, element 34-1 can include a combination of 1: N DUs and/or 1 or more CUs with, for example, a single DU aggregating multiple RUs and/or a single CU aggregating multiple DUs.

The current disclosure is reflective of future networking infrastructure which can largely rely on the resources in the edge-cloud continuum. Existing deployments (e.g. based on the O-RAN Alliance specifications) may already be enabled by the virtualization of radio stacks. The forecasts and the currently operational networks clearly show that the more traffic will be processed closer to the users in the next few years due to, for example, real-time IoT applications. Moreover, the user traffic growth is undergoing a trend of an exponential increase and it applies to access networks, but is especially challenging in wireless systems.

In order to sustain the growing traffic demand and supply the well-matched capacity in wireless access, there are few options known: a) acquiring more spectrum-which is the key resource to deliver the future traffic volumes, b) improving the spectral efficiency of the existing communication technologies and c) densifying access points (e.g. radio units) without amending the spectrum.

This first option of bringing more spectrum is feasible most easily only at the beyond 6 GHz bands, where there is a vast amount of frequency resources. However, the disadvantage is the resulting networks rely on much shorter wavelengths and thus are also more prone to mobility artifacts and environmental obstacles. On the contrary, the mid-bands (below 6 GHZ) are already crowded. The recent reports show that an order of additional 1000 Mhz per mobile operator would need to be available in major cities (with up to 8-18 k people/sq km) by ca. 2030, in order to assure the expected capacity growth. But the existing macro access points (AP) infrastructure, has not much room for extension of the current cells deployment locations. Also access to such an amount of spectrum is extremely hard without essential refarming.

Secondly, improving the spectral efficiency is feasible with a multitude of techniques like e.g. NOMA, RSMA, mMIMO, beamforming, interference mitigation and cancellation, etc. However, the foundations of these technologies aim at removing the interference resulting from a legacy cellular approach to resource management in the cellular networks-which is so called competitive RRM. In this approach, each AP allocates resources selfishly, i.e. without maximizing global optimum for the whole network, instead focusing on just a local optima. Such operational foundations lead to interference itself. Improving the existing situation without upgrading the philosophy (paradigm) itself might not be an efficient or even appropriate solution for extending networks' capacity. Instead, the cooperative RRM approach with well aligned controls that cooperate among cells is the virtue that enables the resolution of the incorrect foundations of the existing cellular wireless systems (e.g. 4G, 5G).

In order to increase capacity of the future networks, the number of antennas (radio units) may be increased by adding additional "underlay" small-cell networks that can coexist with the current macro AP topologies (or be built as standalone systems). The use of such complementary infrastructure removes the need to chase the new spectrum bands. New spectrum bands can still be acquired but the mmWaves and higher frequencies should mainly be used with the focus on the indoor locations due to more control over the radio environment there.

The densification of the access points and their ubiquity benefits from moving RAN components closer towards the Edge. This is understood not only as computing resources provisioned by telco vendors or operators but also as shared computing infrastructure are designed to serve many applications coming from multiple vendors. Such Edge computing infrastructure available to the next generation software will likely be distributed and shared. In addition, computing resources will be volatile to some extent. Some resources will be spawned, some will be detached from the network, others will be simply busy at the moment with existing workloads. At the same time, it is expected that there will be a significant emphasis on the cost and energy efficiency of the software. Moreover, the multitude of Edge applications, including those residing at the end user side, will benefit from fine-tuning of the base station itself. Therefore, future Radio Access Networks will have to be highly flexible—in respect to the instantaneous availability of the computing resources but also the application requirements. To achieve highly robust and scalable radio stacks in RAN, a special designs for the underlying SW architecture are desirable.

Existing SW architecture paradigms include, among others a popular microservice architecture where an application is divided into small, independent services which through the mutual interactions form a working software. Software built in this approach is easily manageable. However, this design is aimed at Web applications where the delay constraints in communication between software components are relaxed. Therefore, applying legacy microservice architecture to RAN designs would result in failing stringent delay requirements. On the other hand, there are monolithic solutions which, due to their architecture, provide a tailored design ensuring e.g. efficient communication and resource utilization. The drawback of this approach is, however, its inflexibility in terms of adoption into the changing computing infrastructure but also inherent incapability to efficiently manage the development and maintenance of the software itself.

In particular, a flexible SW architecture that can be used in SW defined RAN and/or other configurations is disclosed herein in various embodiments, examples and/or combinations-one or more of which provide the following advantages and/or improvements over traditional designs.

- An architectural design for delivering highly-adaptable deployment structure, for real-time radio stack (that includes capsules, modules, liquidity controller and/or interfaces/adapters);
- specific adapters/muxes (to assure seamless communication between modules);
- a message exchange protocol that is independent of inter-capsule interfaces;
- an adaptable internal architecture that can repurpose itself and adjust its composition from a monolith (single module, single process, single machine) to highly-decomposed solution (distributed modules, distributed capsules, multiple nodes);
- a design that supports a distributed RAN's protocol layer cooperation (e.g., cooperative scheduling);
- a design that is suited to edge-cloud deployments and is capable of on-demand, online scaling;
- a design that supports polymorphism of modules at run-time (module composition can be changed without engaging of the external orchestrator);
- a Liquidity Controller (LC) that enables high degree of distribution for radio stacks
- a design that can be applied also in non-RAN applications where the real-time, flexibility and adaptability of SW components are available
- universal role of capsules for realtime communications (e.g., managed by an external operating system thread or other mechanism).

Various examples and/or embodiments present a very pragmatic perspective of building blocks for a successful design of the RAN stacks, which meets the requirements of the future networks (e.g. IMT-2030). The SW components and the architectural foundations, described herein are the key building blocks that, on one hand, fit into the generic concept of service based architecture, but at the same time provide operational optimization of the monolith solution. One or more of these examples and/or embodiments facilitate:

- building a scalable, flexible, robust and real-time radio stacks to form 5G and next generation networks,
- deploying radio stack for 5G and beyond, to suite the multiple solutions for the edge-cloud continuum, enabling the seamless functional splits for 5G (and beyond) network designs—i.e. the 3GPP functional splits should be considered as sample of the overarching set of options, modifying the deployment of radio stack components (e.g. DU, CU, RU) prior or during operation of the stack without breaking the RAN function execution, supporting cooperation between stack instances (and selected protocols) at various levels of the stack layers (e.g. direct cooperation between a number of stack instances), leading to support of multiple future updates and modernizations of RAN deployments (e.g. mesh, cell-free, etc.).

The above mentioned features can be facilitated by optimized SW-design concepts of the radio stack, which allow a future radio stack to be fully portable, custom-based disaggregated and to an extent "fluid" with regards to the capability to adjust to resources available in the computing space.

Various examples and/or embodiments involve blocks for RAN stacks, among others, that provide suitability for situations where the computing resources in the edge undergo dynamic changes due to the emerging nature of the new applications that may rely more heavily on the support from AI/ML algorithms, might consume resources intensively, and can vary the amount of resources that might be expected. Various examples and/or embodiments allow compliant RAN networks to be ultra-flexible in where, when and how they are deployed and furthermore are compatible with dense deployments, the efficient use of computing resources, combined with the necessary access network architecture upgrades (e.g. cell-free) and efficient algorithms that support cooperative RRM, and can address the high expectations of future networks (e.g. 6G).

Various examples and/or embodiments involve a system and/or method for use with a radio access network having a plurality of capsules that operate in parallel to cooperatively perform RAN stack operations, each capsule utilizing a processor and a memory configured to perform a corresponding component of the RAN stack operations. The RAN stack operations can result in:

communicating backhaul communications with a core communication network;

communicating fronthaul communications with a plurality of radio units configured to engage in wireless communications with a plurality of user equipment (UEs) via a radio channel of a radio network;

converting, in accordance with a communication standard, received fronthaul communications from the plurality of radio units into backhaul communications transmitted to the communications network; and converting, in accordance with the communication standard, received backhaul communications from the communications network into fronthaul communications transmitted to the plurality of radio units.

In addition or in the alternative to any of the foregoing, the operations further include: generating a UE to PRB to RU allocation that associates ones of a plurality of PRBs to selected ones of the plurality of UEs and selected ones of a plurality of RUs.

In addition or in the alternative to any of the foregoing, the corresponding components of the RAN stack operations performed by two or more plurality of capsules is implemented via a single thread.

In addition or in the alternative to any of the foregoing, a first subset of capsules is implemented by a first module under control of a first liquidity controller, wherein a second subset of capsules is implemented by a second module under control of a second liquidity controller, and wherein the first subset of capsules are mutually exclusive of the second subset of capsules.

In addition or in the alternative to any of the foregoing, the first liquidity controller controls life cycle management tasks of the first subset of capsules and the second liquidity controller controls life cycle management tasks of the second subset of capsules.

In addition or in the alternative to any of the foregoing, the first liquidity controller is configured to selectively add a new capsule to the first subset of capsules and wherein the first liquidity controller is further configured to selectively remove an existing capsule from the first subset of capsules.

In addition or in the alternative to any of the foregoing, multiplexers in the first module and the second module support logical links between two or more of the first subset of capsules and two or more of the second subset of capsules.

In addition or in the alternative to any of the foregoing, at least one first capsule of the first subset of capsules communicates directly with at least one second capsule of the second subset of capsules.

In addition or in the alternative to any of the foregoing, the first liquidity controller and the second liquidity controller cooperate to support migration of a first capsule from the first subset of capsules to the second subset of capsules.

In addition or in the alternative to any of the foregoing, the migration includes: recreating the first capsule as a new first capsule in the second module; moving a context to the new first capsule in the second module; and removing the first capsule from the first module.

In addition or in the alternative to any of the foregoing, the migration is performed during stack run-time.

In addition or in the alternative to any of the foregoing, the migration is triggered by a fault.

In addition or in the alternative to any of the foregoing, the migration is performed as part of a fault prevention.

In addition or in the alternative to any of the foregoing, the migration is performed as part of a security mechanism in response to a security attack on the RAN.

In addition or in the alternative to any of the foregoing, the plurality of capsules include a detection capsule configured to monitor network traffic and/or system hardware and to detect the security attack.

In addition or in the alternative to any of the foregoing, the plurality of capsules further include a mitigation capsule configured to mitigate the security attack via one or more protective actions.

In addition or in the alternative to any of the foregoing, a liquidity controller controls life cycle management tasks of the first subset of capsules.

In addition or in the alternative to any of the foregoing, the liquidity controller is configured to selectively add a new capsule to the first subset of capsules and wherein the liquidity controller is further configured to selectively remove an existing capsule from the first subset of capsules.

In addition or in the alternative to any of the foregoing, the plurality of capsules are configured to support slicing functionality to separately process different types of signals or different types of data corresponding to differing applications, wherein the differing applications include: 5G, media streaming, and/or gaming.

In addition or in the alternative to any of the foregoing, the plurality of capsules perform RAN stack operations corresponding to a plurality of RAN stacks.

In addition or in the alternative to any of the foregoing, the RAN includes a plurality if RUs, a subset of the plurality of capsules support cooperative scheduling across the plurality of RAN stacks.

In addition or in the alternative to any of the foregoing, the cooperative scheduling includes generating a UE to PRB to RU allocation that associates ones of a plurality of PRBs to selected ones of the plurality of UEs and selected ones of the plurality of RUs.

Further details regarding the operation of the flexible SD-RAN SW architecture, including several alternatives and optional functions and/or features, are presented in conjunction with the discussion that follows.

Figure 1B:
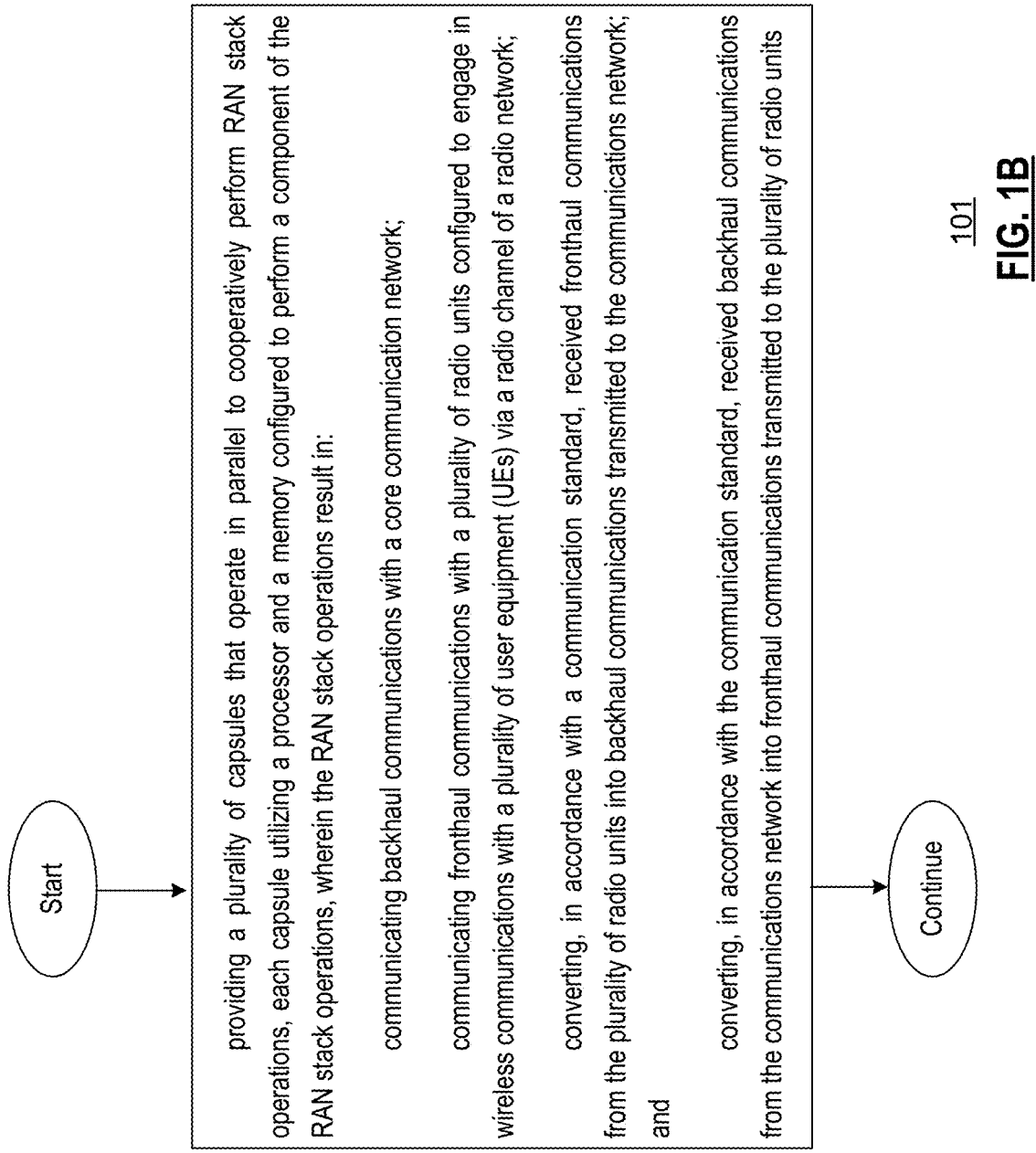
FIG. 1B is a flow diagram illustrating a non-limiting example of a method in accordance with various aspects described herein.

FIG. 1B is a flow diagram illustrating a non-limiting example of a method 101 in accordance with various aspects described herein. In particular, a method is presented for use in conjunction with any of the example architectures, examples, and/or embodiments described previously or in the sections that follow. The method includes providing a plurality of capsules that operate in parallel to cooperatively perform RAN stack operations, each capsule utilizing a processor and a memory configured to perform a component of the RAN stack operations, wherein the RAN stack operations result in: communicating backhaul communications with a core communication network; communicating fronthaul communications with a plurality of radio units configured to engage in wireless communications with a plurality of user equipment (UEs) via a radio channel of a radio network; converting, in accordance with a communication standard, received fronthaul communications from the plurality of radio units into backhaul communications transmitted to the communications network; and converting, in accordance with the communication standard, received backhaul communications from the communications network into fronthaul communications transmitted to the plurality of radio units.

In addition or in the alternative to any of the foregoing, the operations further include: generating a UE to PRB to RU allocation that associates ones of a plurality of PRBs to selected ones of the plurality of UEs and selected ones of a plurality of RUs.

In addition or in the alternative to any of the foregoing, the corresponding components of the RAN stack operations performed by two or more plurality of capsules is implemented via a single thread.

In addition or in the alternative to any of the foregoing, a first subset of capsules is implemented by a first module under control of a first liquidity controller, wherein a second subset of capsules is implemented by a second module under control of a second liquidity controller, and wherein the first subset of capsules are mutually exclusive of the second subset of capsules.

In addition or in the alternative to any of the foregoing, the first liquidity controller controls life cycle management tasks of the first subset of capsules and the second liquidity controller controls life cycle management tasks of the second subset of capsules.

In addition or in the alternative to any of the foregoing, the first liquidity controller is configured to selectively add a new capsule to the first subset of capsules and wherein the first liquidity controller is further configured to selectively remove an existing capsule from the first subset of capsules.

In addition or in the alternative to any of the foregoing, multiplexers in the first module and the second module support logical links between two or more of the first subset of capsules and two or more of the second subset of capsules.

In addition or in the alternative to any of the foregoing, at least one first capsule of the first subset of capsules communicates directly with at least one second capsule of the second subset of capsules.

In addition or in the alternative to any of the foregoing, the first liquidity controller and the second liquidity controller cooperate to support migration of a first capsule from the first subset of capsules to the second subset of capsules.

In addition or in the alternative to any of the foregoing, the migration includes: recreating the first capsule as a new first capsule in the second module; moving a context to the new first capsule in the second module; and removing the first capsule from the first module.

In addition or in the alternative to any of the foregoing, the migration is performed during stack run-time.

In addition or in the alternative to any of the foregoing, the migration is triggered by a fault.

In addition or in the alternative to any of the foregoing, the migration is performed as part of a fault prevention.

In addition or in the alternative to any of the foregoing, the migration is performed as part of a security mechanism in response to a security attack on the RAN.

In addition or in the alternative to any of the foregoing, the plurality of capsules include a detection capsule configured to monitor network traffic and/or system hardware and to detect the security attack.

In addition or in the alternative to any of the foregoing, the plurality of capsules further include a mitigation capsule configured to mitigate the security attack via one or more protective actions.

In addition or in the alternative to any of the foregoing, a liquidity controller controls life cycle management tasks of the first subset of capsules.

In addition or in the alternative to any of the foregoing, the liquidity controller is configured to selectively add a new capsule to the first subset of capsules and wherein the liquidity controller is further configured to selectively remove an existing capsule from the first subset of capsules.

In addition or in the alternative to any of the foregoing, the plurality of capsules are configured to support slicing functionality to separately process different types of signals or different types of data corresponding to differing applications, wherein the differing applications include: 5G, media streaming, and/or gaming.

In addition or in the alternative to any of the foregoing, the plurality of capsules perform RAN stack operations corresponding to a plurality of RAN stacks.

In addition or in the alternative to any of the foregoing, the RAN includes a plurality if RUs, a subset of the plurality of capsules support cooperative scheduling across the plurality of RAN stacks.

In addition or in the alternative to any of the foregoing, the cooperative scheduling includes generating a UE to PRB to RU allocation that associates ones of a plurality of PRBs to selected ones of the plurality of UEs and selected ones of the plurality of RUs.

Figure 1C:
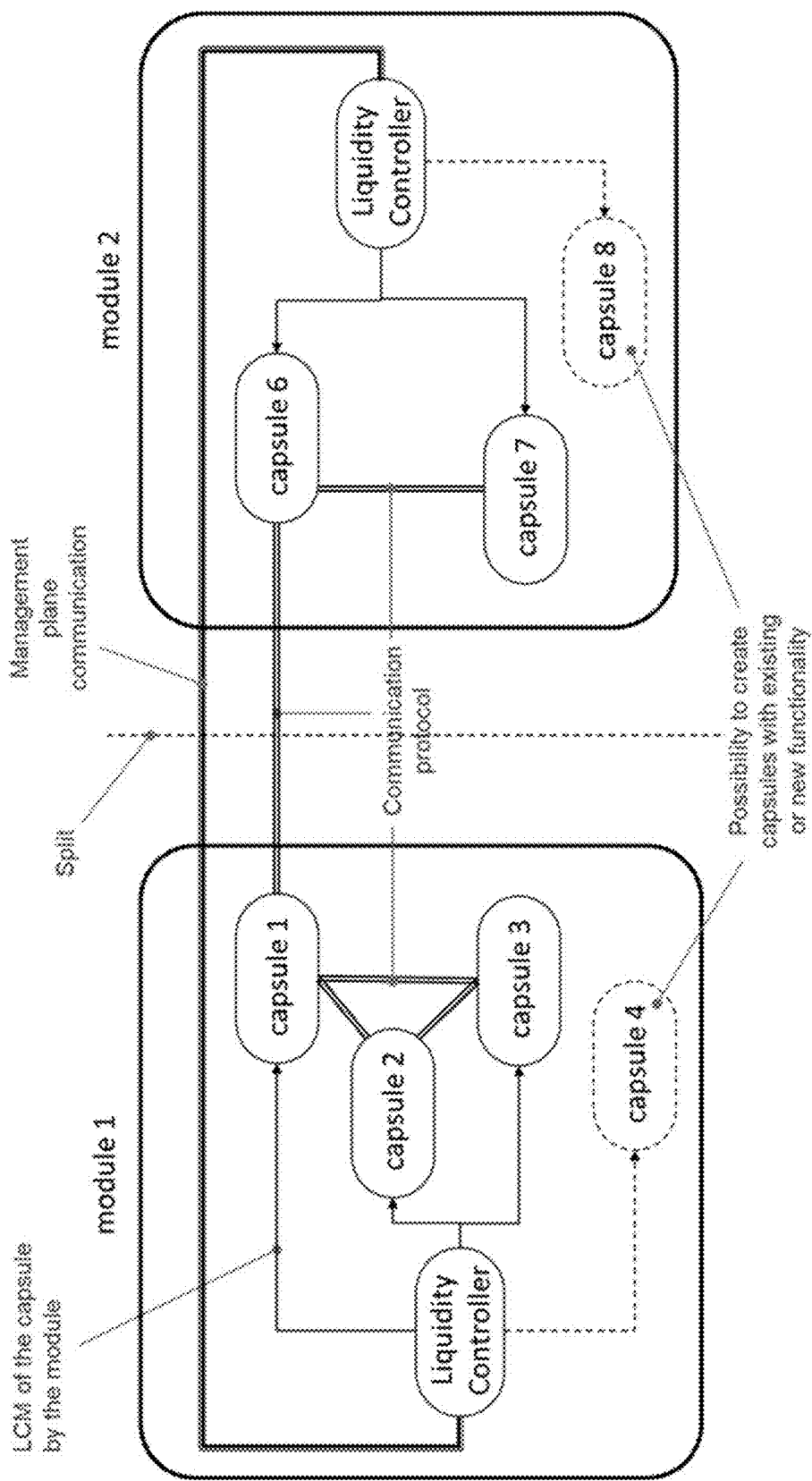
FIG. 1C is a schematic/flow diagram illustrating a non-limiting example of an architecture in accordance with various aspects described herein.

FIG. 1C is a schematic/flow diagram illustrating a non-limiting example of an architecture in accordance with various aspects described herein. An example SW architecture is presented where the overall RAN stack is divided into small functionality chunks called capsules. In various examples and/or embodiments, these capsules can have one or more of the following characteristics a. Granularity of capsules can be arbitrary.
   b. Capsules can be configured in the arbitrary way given the configuration options available for a given capsule, c. Capsule specifies protocols it can use to communicate with other capsules for both—the internal and external communication variants. In the internal communication variant capsules communicate with each other within a module (see next section) while external communication variant capsules communicate across modules (e.g. residing on different hosts). Internal communication can take benefits of fast in-process communication (e.g. shared memory) while external communication can take form of any communication protocol, d. Capsules communicate via bi-directional ports and the means for communication in the capsule-to-capsule relation are defined ad-hoc (at UML level) by a port's protocol model e. The following parameters are determined/optimized for each capsule: data object, number of ports, protocols used for communication outside the capsule f. Capsule receives data objects, conforming to the port protocols, processes the data and (optionally) sends data objects, again, conforming to the port protocols.

g. Number of capsules can be related to the context of its operation (e.g. user terminal context). Such context can be subject to exchange between capsules residing in the same or different modules or host machines, h. Some capsules can be created per UE, bearer or slice (e.g., PDCP protocol layer) while others can be common for the entire stack instance (e.g., MAC protocol layer), and i. Capsules can be stateful, i.e. their operations are tightly coupled with the context, or stateless, i.e. their operations are decoupled with the context.

Figure 2:
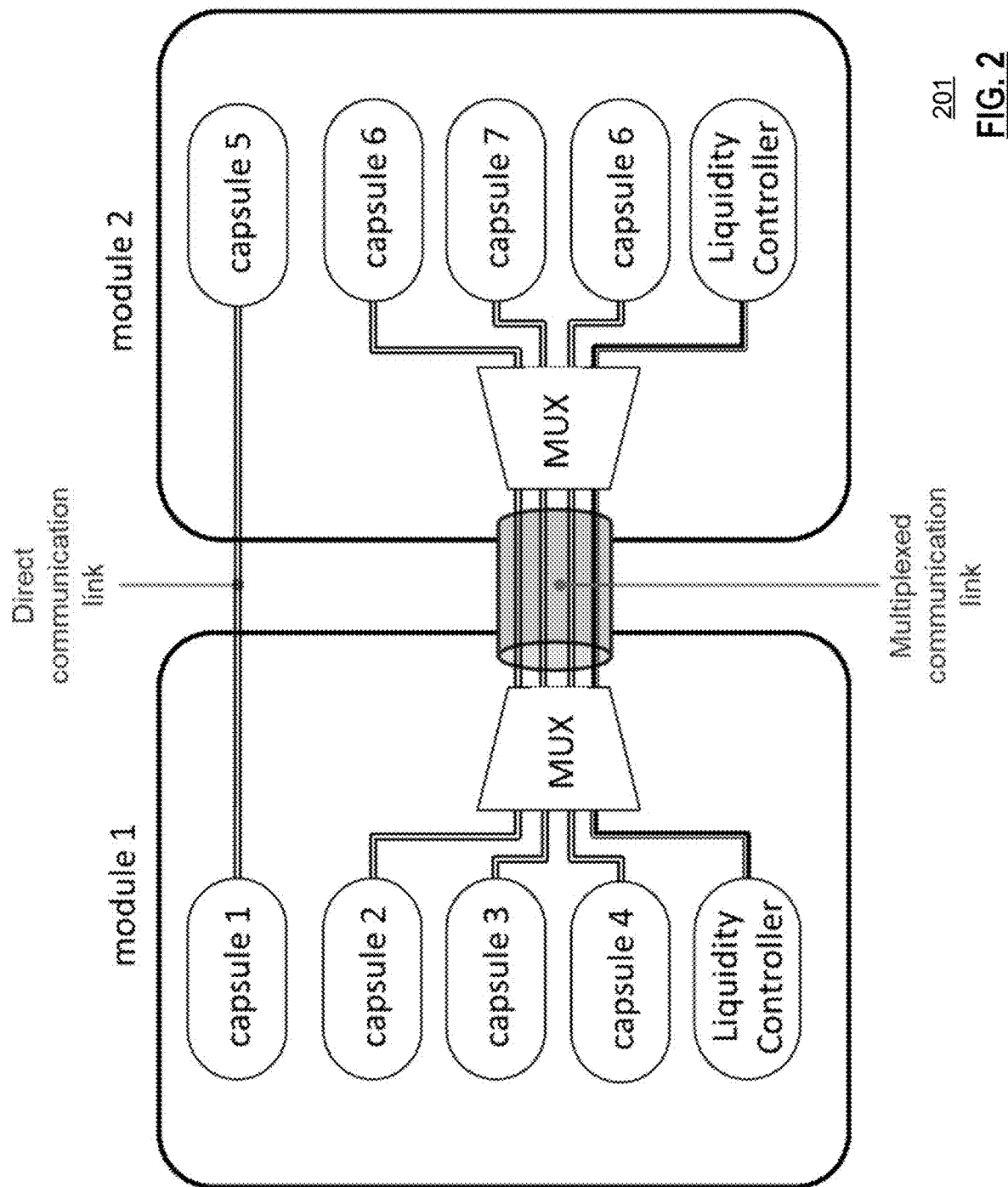
FIG. 2 is a schematic/block diagram illustrating a non-limiting example of communication between modules in accordance with various aspects described herein.

In various examples and/or embodiments, these capsules can be grouped together into entities called modules. In various examples and/or embodiments, modules can represent a service understood as independently deployable, loosely coupled, possibly fine grained software function. Modules can have one or more of the following capabilities:

a. A module can contain as little as one capsule or as many as all capsules into which particular software (e.g. radio stack) can be decomposed, b. Modules control the life-cycle management (LCM) of all the capsules they contain (creating, configuring, running, reconfiguring, stopping and rerunning capsule instances) through a controller called a LC (Liquidity Controller), c. The information or context needed for the LC to make particular action can come from multiple sources, e.g.: capsules, other LCs (from different modules), but also other, external sources of information or context, d. LCs can communicate with each other via management plane communication which can be centralized or decentralized, e. LC itself can be considered as a capsule, f. LC enables standalone decision making related to dynamic adaptations of a module, without the need for interactions with the standard-based orchestrators (e.g. ETSI NFV), although, LC could naturally be considered as a main connection point for the external orchestrator, based on either (a) ETSI MANO architecture or alternatively (b) any container based architecture, e.g. Kubernetes, if the need arises to combine RAN stack adaptation and computing infrastructure management, g. A module is capable of spawning and/or removing any capsule on demand, at run-time, it is a so-called module polymorphism. It is done through LC, h. Modules, through the management plane communication of LC, are able to exchange user context. Together with point g) it enables capsule migration capability, i. The communication between capsules across modules can be aggregated and serialized (resembling a multiplexer or MUX function) to simplify the cross-module communication (see e.g., FIG. 2). An example use of such an approach could be the control plane communication, j. Two communicating modules implement a RAN split. Split options can be defined beyond the traditional approach: horizontal (e.g. DU-CU) or vertical (CU-UP-CU-CP), or a combination of both (e.g. diagonal). Split design is only limited by the granularity of the capsules, k. Connected modules together form a fully functional RAN protocol stack, l. The module can be virtualized in a form of e.g. a virtual machine or a container.

In various examples and/or embodiments, adoption of the system of capsules in the construction and design of RAN stack enables the use of the following advantages:

Capsules support parallelism—the programming and testing activities can be optimized by reducing time for integration and speeding up the development/testing. In addition, with the parallelism of program execution, the RAN stack can utilize the CPU multithreading capability (coming from multiple cores per CPU) and hence utilize the proliferating multicore architectures, Possibility to optimize the communication between capsules depending on the goals (e.g. URLLC) or deployment. E.g. capsules inside modules can use fast communication based on shared memory while communication between capsules across modules can take the form of any standard communication protocol, Capsules contain and process data inside, they allow splitting processing easily between UL/DL, allow for scaling and provide safe operation, Capsules expose message processing routines to the LC, which dynamically manages the actual processing within execution threads, With capsules, parallelization of the processing inside stack becomes easily achievable when enhanced with additional enablers, When aligned with the thread assigning mechanisms for the data transfer in DL and UL which provides a single thread (separately for DL and UL) to process functionalities of capsules in data-oriented manner (e.g. one thread per capsule group handling an incoming message), they can assure almost zero-cost of processing data inside RAN protocol stack. Data-oriented thread assignment mechanism built with the use of the capsule concept enables CPU optimization for different latency demands of the services based on the elastic thread assignment algorithms, Capsules can be configured independently which can lead to capsule customization, depending on e.g. slice type, etc.

Depending on their role, capsules can be grouped per RAN, slice, UE or bearer which allows for designation-based capsule grouping. It can be beneficial in terms of capsule isolation and scaling. For example separate modules can be created for each new user. If a need arises, users can be easily migrated between modules in different physical hosts and grouped together in order to apply similar treatment or support similar QoS (e.g., delay).

In various examples and/or embodiments, the use of a capsule based, highly modular, scalable and polymorphic design that is further based on a Liquidity Controller provides the following advantages:

Flexible design for different scenarios:
- Given a capsule brings the atomic functionality piece of the RAN stack, the stack itself can be decomposed into any number of modules (containing at least one capsule or as many as all capsules). This feature provides following advantages
  - The stack can be disaggregated to fit into any distribution of computing resources, therefore utilizing existing or available computing infrastructure to a greater extent,
  - Capsules can be grouped together in various perspectives e.g., i) per user, ii) per slice iii) per bearer iv) per functionality (e.g. grouping schedulers from different stacks to perform cell-free scheduling). It gives the unprecedented possibility of functional isolation (similar functions grouped together for more effective collaboration service isolation (functions related to specific service (e.g., particular user) can be grouped together for security, reliability or scaling purpose) leading to higher portability, and simplified manageability,
  - Modules representing stack services can be customized, given the specific functionality of the capsules included. This gives the possibility to create different variants of the same stack blocks fitting different scenarios. E.g. it can be easy to create multiple copies of CU user-plane: a) CU_U_basic (for standard deployment), b) CU_U_scalable (for enabling scalability of user-plane) and c) CU_U_LBO for enabling special routing inside the PDCP that allows rule-based traffic redirection for enabling the local breakout to local streaming server,
  - flexible scaling-virtualized modules can be scaled with the use of existing orchestration tools. The capability to define and control the amount and type of capsules per module adds up to the scaling flexibility of RAN stack (e.g., fine grained or coarse grained).
- Capsules can be configured independently and arbitrarily. This can impose different behavior of different instances of the same capsule further improving the flexibility of the deployment. For example, a capsule containing PDCP functionality can be configured in AM (Acknowledged Mode) or UM (Unacknowledged Mode). Such customization can be extrapolated to whole modules (see, e.g., "Example 2" described below),
- Communication optimization possibility through adjusting communication means per capsule pair, e.g. high speed communication between capsules within a module (shared-memory) and any communication protocol used across modules. It enables adjustment of the RAN stack disaggregation towards target scenario (e.g. low latency),
- Seamless operations and adjustment to changing requirements—module polymorphism allows RAN stack to change the module composition at run-time. This in turn can lead to a scenario where software can intentionally redistribute its functionalities across modules, across different computing nodes (together with user context migration). Mechanisms like this (whether distributed or centralized) can pave the way for functionality migration and fault management mechanisms which can work without direct intervention of the orchestrator and hence have a much faster reaction ensuring seamless user experience. Various additional examples numbered 1-7 are presented in the following sections.

These examples can be used in conjunction with any of the foregoing and/or in combination with one another.

Example 1: A Module Covering CU-UP Functionality Disaggregated into Capsules

Figure 3:
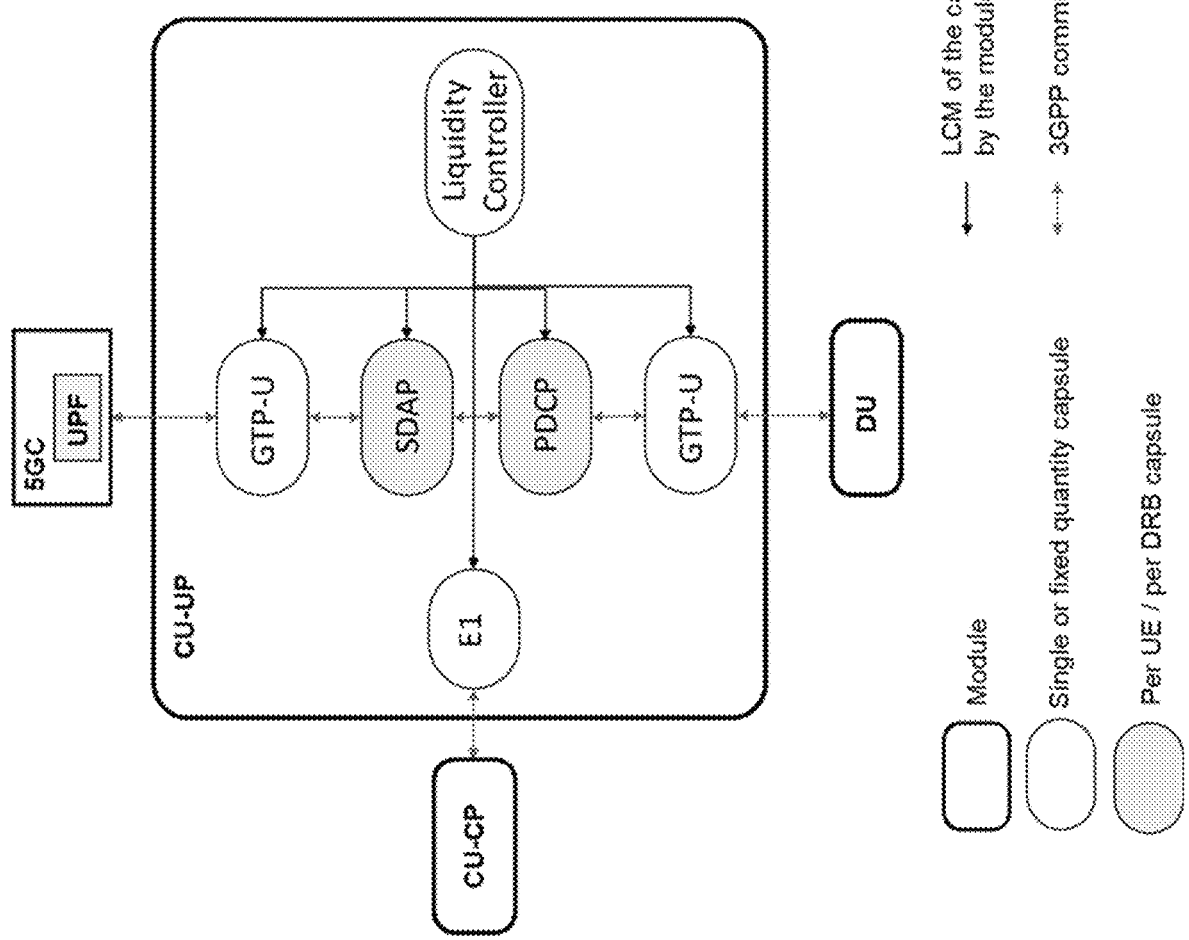
FIG. 3 is a schematic/block diagram illustrating a non-limiting example of a RAN stack component disaggregation in accordance with various aspects described herein.

As mentioned, capsules enable forming of the modules of arbitrary functionality. In this example we present a disaggregation of the upper part of the protocol stack into capsules. Capsules are aggregated into a module whose functionality is equivalent to CU-UP (see, e.g., FIG. 3). In this example implement whole protocols from the protocol stack (PDCP, SDAP), as well external interfaces (GTP-U, E1), however the granularity of the capsules can be higher where it is deemed suitable (e.g. PDCP can be divided into PDCP_High and PDCP_Low). Moreover, FIG. 3 also shows that the capsules related to 3GPP protocols can be instantiated separately for the user or bearer.

Figure 4:
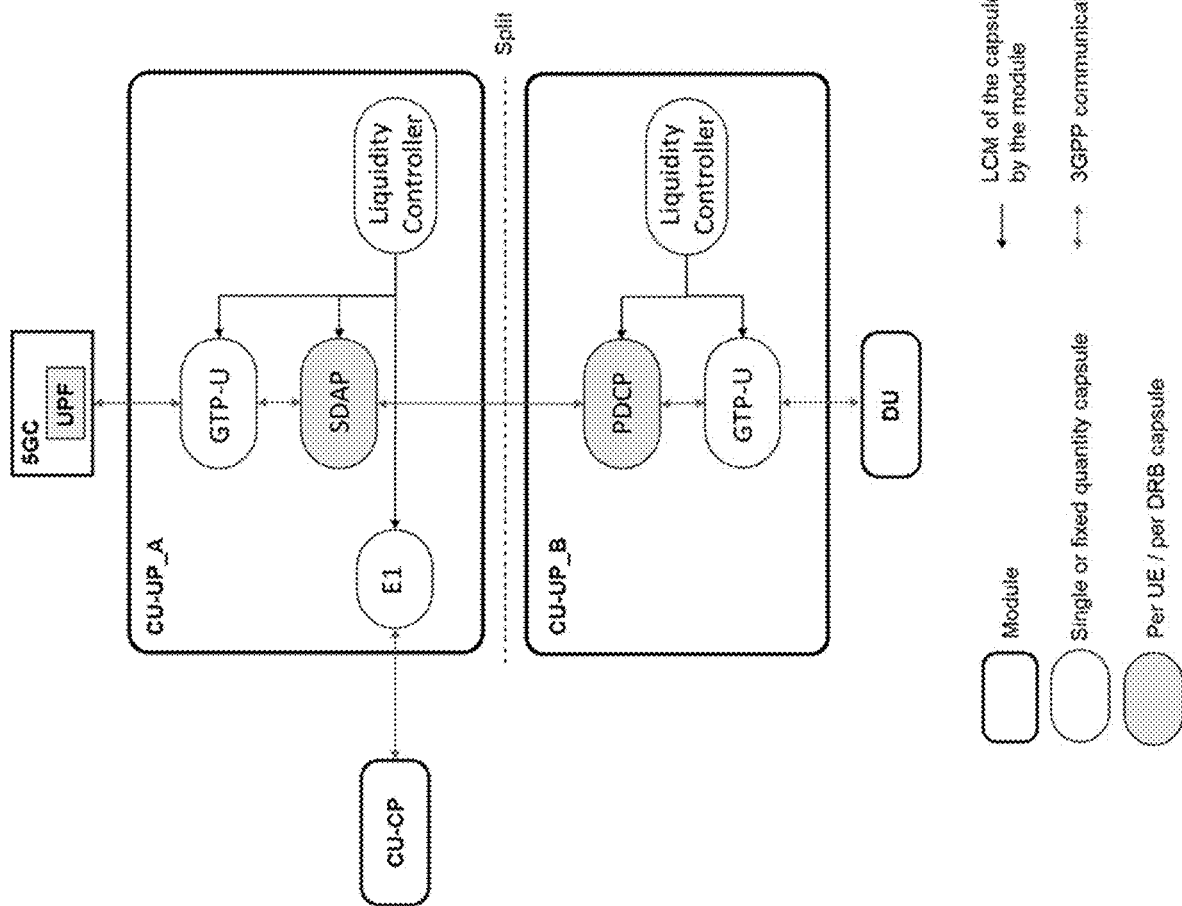
FIG. 4 is a schematic/block diagram illustrating another non-limiting example of a RAN stack component disaggregation in accordance with various aspects described herein.

In addition, a stack functional component (e.g. CU-UP) can be either centralized or distributed between multiple modules (and also processing nodes)—see FIG. 4 for an example of a distributed deployment.

Example 2: Natural Support for Slicing Based on the Decoupled vRAN Design

Owing to the architecture introduced herein and the presented benefits of the flexible RAN, it becomes straightforward to customize the capsule or, as a consequence, the module depending on e.g. user group or slice (application type) in order to add, remove or tweak some functionality. Such customized modules, similarly to any RAN module, can be deployed across various locations.

In accordance with various examples, a radio access network (RAN) system includes a plurality of capsules that operate in parallel to cooperatively perform RAN stack operations, each capsule utilizing a processor and a memory configured to perform a corresponding component of the RAN stack operations, wherein the plurality of capsules are configured to support slicing functionality to separately process different types of signals and wherein the RAN stack operations result in:
- communicating backhaul communications with a core communication network;
- communicating fronthaul communications with a plurality of radio units configured to engage in wireless communications with a plurality of user equipment (UEs) via a radio channel of a radio network;
- converting, in accordance with a communication standard, received fronthaul communications from the plurality of radio units into backhaul communications transmitted to the core communications network; and
- converting, in accordance with the communication standard, received backhaul communications from the core communications network into fronthaul communications transmitted to the plurality of radio units.

In addition or the alternative to any of the foregoing, the slicing functionality further supports different types of data corresponding to differing applications.

In addition or the alternative to any of the foregoing, the differing applications include two or more of: 5G, media streaming or gaming.

In addition or the alternative to any of the foregoing, the different types of signals correspond to different data flows.

In addition or the alternative to any of the foregoing, each data flow of the different data flows serves as a pipe to transfer user data from one or more applications in accordance with a corresponding quality of service requirement.

In addition or the alternative to any of the foregoing, the slicing functionality operates via a plurality of thin slices that each include a subset of the plurality of capsules that collectively provide RAN functionality from each layer of the RAN stack operations.

In addition or the alternative to any of the foregoing, the subset of the plurality of capsules includes a scheduler capsule configured to manage physical resource blocks (PRBs) of one or more radio units (RUs) of the RAN system.

In addition or the alternative to any of the foregoing, operations of the scheduler capsule of each of the thin slices are coordinated via communications with a near real-time RAN intelligent controller (RIC).

In addition or the alternative to any of the foregoing, the subset of the plurality of capsules corresponding to at least one of the plurality of thin slices is implemented via a single module under control of a single liquidity controller.

In addition or the alternative to any of the foregoing, the subset of the plurality of capsules corresponding to at least one of the plurality of thin slices is implemented via a first module under control of a first liquidity controller and a second module under control of a second liquidity controller.

Furthermore, various additional examples including optional functions and features and potential considerations and implementations are included in the descriptions that follow.

From the RAN perspective, the idea behind a network slice can be to dedicate RAN functions and radio resources to handle specific (group) of users, dataflows and/or traffic types. In the realm of radio resource management slicing is implemented by distributing PRBs (Physical Resource Blocks) among served slices. In the functional view, each slice could receive a dedicated Centralized Unit User Plane (CU-UP) component which, depending on the slice latency profile, can be located closer or further from the end user. At the same time, the remaining RAN functional component-distributed unit (DU)—can be shared among slices.

Figure 5A:
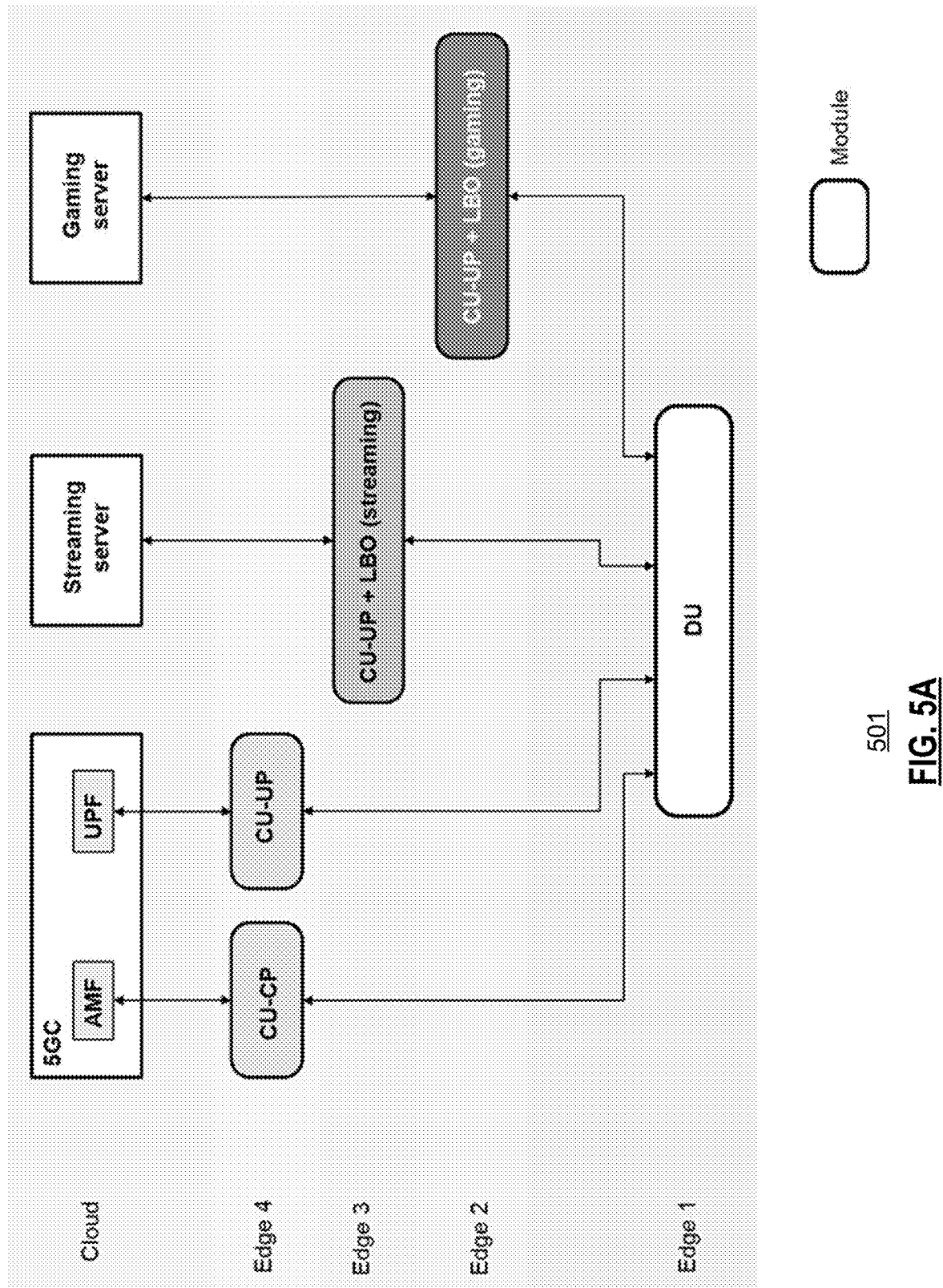
FIG. 5A is a schematic/block diagram illustrating a non-limiting example of slicing support in accordance with various aspects described herein.

RAN system 501 of FIG. 5A demonstrates a situation where the different capsule-based customizations of the CU module are configured: i) CU_CP, ii) CU_UP (basic), iii) CU_UP+LBO (streaming), iv) CU_UP+LBO (gaming), where LBO stands for Local Breakout. Capability of having various types of CU instances is determined by the LC functionality, moreover the different location of DU and CUs is also possible and determined by the LC.

In accordance with this example of delivering slicing functionality, it is enough for the LC to indicate the functionalities (e.g., profiles) of the capsules dedicated to deal with processing of the particular application types, signaling and data.

In various examples, there are several potential design considerations associated with these implementations. These potential considerations include the following:

Reduced security—while CU-UP as a dedicated component can be isolated on the software and hardware levels, a DU may be shared across all the slices without sufficient software or hardware isolation. A shared DU can constitute a security threat as it increases the probability of unauthorized access or data leakage for tenants sharing the DU. This potential issue is currently recognized but unaddressed by telecom standard bodies. It stems from the fact that 1) the hardware and software isolation exceeds the scope of telecom focus 2) The current design of mobile networks tends to centralize, rather than decentralize RAN elements, especially those closer to antennas.

Reduced flexibility of a slice—
Since DU is shared among slices its location and often configuration is fixed serving all the slices. It can lead to bottlenecks when one DU becomes a single point of failure and limits degrees of freedom in terms of configuration and location of the DU since one DU may serve several slices.

Currently supported slice service types (SST) support only a few types (e.g. eMBB). This division is coarse-grained and divides applications into several domains. However the service they provide (radio resource allocation and control, and latency by appropriate CU-UP placement) might not fit closely to many applications' requirements. E.g. applications classified as URLLC slice (Ultra Reliable Low Latency Communication) require, among others, the CU-UP component to be placed close to the edge server a particular application is communicating to. Given there are many such applications and many target edge servers, the best solution from the user perspective would be to place CU-UPs close to every server and accordingly direct traffic from each application to the appropriate server. However more fine grained slicing profiles are needed.

Figure 5B:
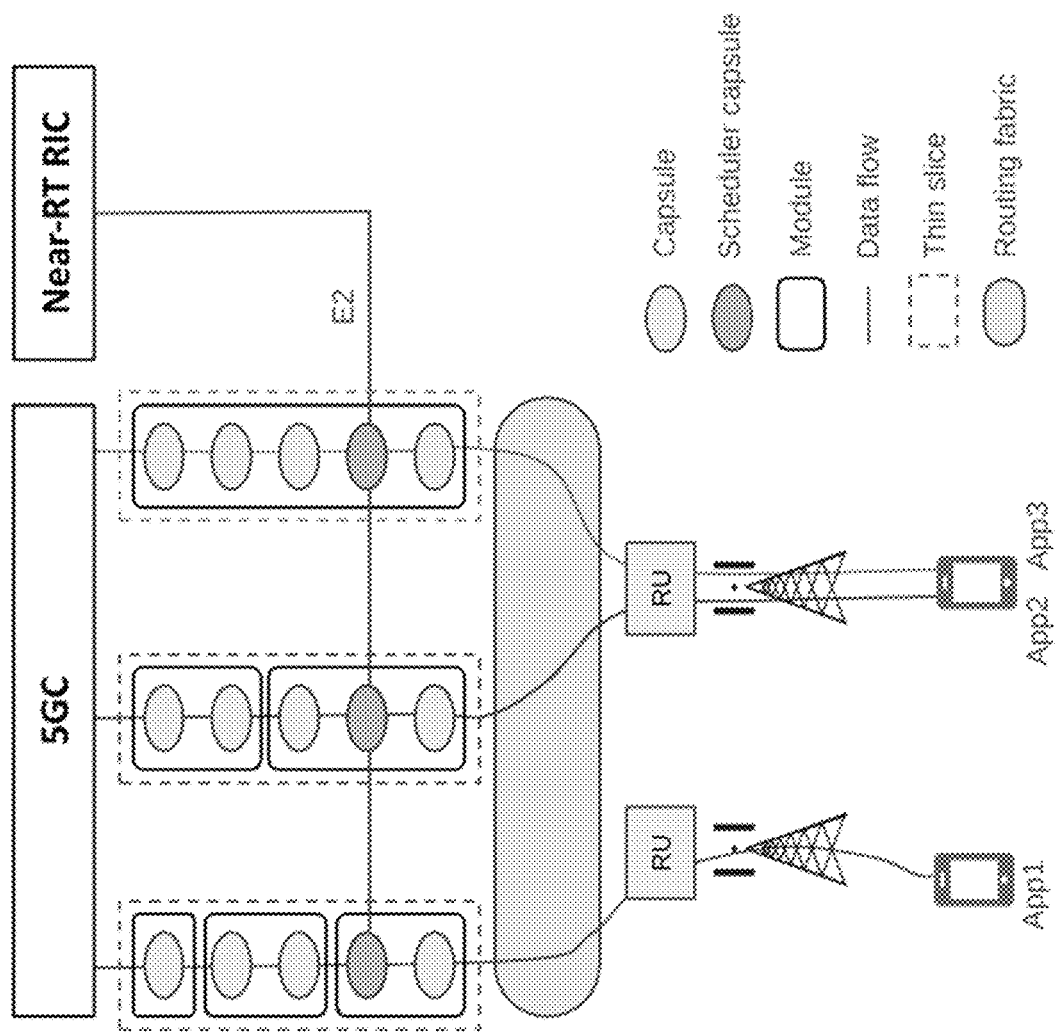
FIG. 5B is a schematic/block diagram illustrating a non-limiting example of thin slices in accordance with various aspects described herein.

Various examples described herein utilize a thin slice where a RAN functional element (capsule/module) in the user plane can be isolated to support user application(s) through the support of a particular QoS flow/bearer which represents said application(s) in RAN. In other words, a thin slice will include enough RAN functionality from each layer of the RAN stack, in the user plane, to serve a particular QoS flow/bearer which serves as a pipe to transfer user data from one or more applications. The stack functionality may span across Hi-PHY and SDAP layers. Thin slices build upon the capsule concept which allows horizontal splits (to divide stack into function; splits). In various examples the stack can be split vertically in a way to provide a dedicated stack in the user plane to support a single data flow (QOS flow/bearer). FIG. 5B shows an example thin slice implementation where for each data flow (serving a distinct application) a dedicated stack (slice) is created. The number of thin slices does not correspond 1:1 to the number of RUs within the RAN network.

Since thin slice implementations may include the entirety of the stack protocols, including a scheduler (in MAC layer), and at the same time various examples provide a dedicated slice for each QoS flow/bearer, it is implied that there will be possibly many schedulers managing radio resources (PRBs) of one or more RUs. This approach can involve determining how PRBs corresponding to an RU can be distributed across different slices' schedulers. Various examples utilize Near-RT RIC communication over the E2 interface to instruct schedulers which PRBs can be used by a thin slice to ensure isolation between slices.

In examples where a thin slice includes a layer supporting fronthaul communication (MAC or HiPHY, depending on the fronthaul split), each thin slice can communicate over fronthaul directly with the RU serving a particular user with served QoS Flow. For this reason a single RU (at e.g. LoPHY when considering split 7.2) can utilize a communication link with multiple thin slices at the same time. In this case, a routing fabric between LoPHY and HiPHY (or HiPHY and MAC, or any other fronthaul split) can be employed. Such routing fabric can abstract the RU from the rest of the stack.

Various examples involving thin slices improve the technology of RAN systems by facilitating:

Isolation—Thin slices can be functionally independent from other thin slides as they include the entire stack functionality (in user plane) and can be deployed on a dedicated hardware and be provided with dedicated secure measures.

Customization—a thin slice can be customized in terms of functionality (which capsules and with what customization), function aggregation (each slice can be arbitrarily divided into modules via appropriate horizontal splits) and deployment (the location where modules are placed) to serve particular needs of a QoS flow of a particular application, Distribution—Thin slicing allows it to be easily distributed across computing infrastructure, due to the arbitrary (horizontal) functional split options, which can lead to the optimization of the use of computing resources. This comes from the fact that the computing resource topology can be taken into consideration when deciding about horizontal splitting in a way that resultant modules implementing desired splits can fit to the available computing infrastructure.

Scaling—it provides a very flexible way to scale the stack-only if a new QoS flow is formed, the stack expands and consumes only as much resources as QoS flow requires. Similarly if QoS flow is no longer needed, the thin slice can be decommissioned freeing up the computing resources. This approach is aligned with the serverless paradigm in which computing resources are allocated to execute a function only when it is needed.

Application oriented design—in 5G mobile networks QoS flow represents the QoS needs of one or more applications. Thin slice, through its support for QoS flow, can represent the user application. Current design usually ties applications to User Equipment (UE) e.g. smartphones. However it is easy to envision that applications can be separated from End Points and use different cellular End Points to perform communication. An example could be a mobile phone which connects to the internet via Fixed Wireless Access (FWA) technology. FWA devices use a cellular network to have access to the Internet, while providing WiFi signal to home appliances including mobile phones. If a mobile phone moves across different FWA access points the QoS flow related to the smartphone application might need to restart each time. With the presented solution a dedicated thin slice could be already present within the RAN network without the need to recreate the QoS flow dedicated to the application. Such an approach would mitigate such recreation delay.

Figure 5C:
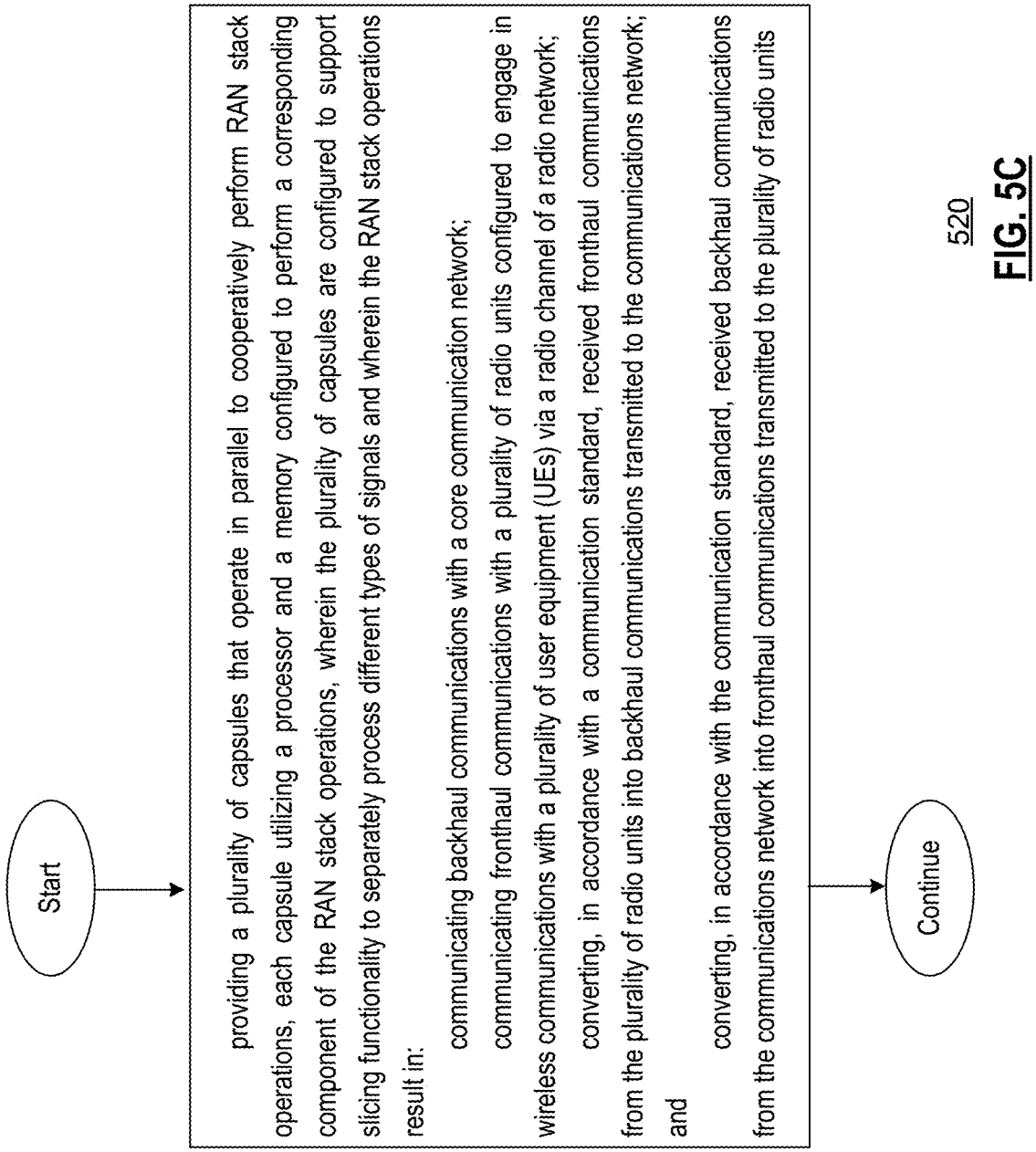
FIG. 5C is a flow diagram illustrating a non-limiting example of a method in accordance with various aspects described herein.

FIG. 5C is a flow diagram illustrating a non-limiting example of a method 520 in accordance with various aspects described herein. In particular, a method is presented for use in conjunction with any of the example architectures, examples, and/or embodiments described previously or in the sections that follow.

The method includes providing a plurality of capsules that operate in parallel to cooperatively perform RAN stack operations corresponding to a plurality of RAN stacks, each capsule utilizing a processor and a memory configured to perform a corresponding component of the RAN stack operations, wherein the RAN stack operations result in: communicating backhaul communications with a core communication network; communicating fronthaul communications with a plurality of radio units configured to engage in wireless communications with a plurality of user equipment (UEs) via a radio channel of a radio network; converting, in accordance with a communication standard, received fronthaul communications from the plurality of radio units into backhaul communications transmitted to the communications network; and converting, in accordance with the communication standard, received backhaul communications from the communications network into fronthaul communications transmitted to the plurality of radio units.

In addition or the alternative to any of the foregoing, the slicing functionality further supports different types of data corresponding to differing applications.

In addition or the alternative to any of the foregoing, the differing applications include two or more of: 5G, media streaming or gaming.

In addition or the alternative to any of the foregoing, the different types of signals correspond to different data flows.

In addition or the alternative to any of the foregoing, each data flow of the different data flows serves as a pipe to transfer user data from one or more applications in accordance with a corresponding quality of service requirement.

In addition or the alternative to any of the foregoing, the slicing functionality operates via a plurality of thin slices that each include a subset of the plurality of capsules that collectively provide RAN functionality from each layer of the RAN stack operations.

In addition or the alternative to any of the foregoing, the subset of the plurality of capsules includes a scheduler capsule configured to manage physical resource blocks (PRBs) of one or more radio units (RUs) of the RAN system.

In addition or the alternative to any of the foregoing, operations of the scheduler capsule of each of the thin slices are coordinated via communications with a near real-time RAN intelligent controller (RIC).

In addition or the alternative to any of the foregoing, the subset of the plurality of capsules corresponding to at least one of the plurality of thin slices is implemented via a single module under control of a single liquidity controller.

In addition or the alternative to any of the foregoing, the subset of the plurality of capsules corresponding to at least one of the plurality of thin slices is implemented via a first module under control of a first liquidity controller and a second module under control of a second liquidity controller.

Example 3: Implementation of Cooperative Mechanisms in Future Wireless Systems

The architecture presented herein is capable of going beyond currently available specifications (e.g. of 3GPP, ORAN). One such example is the situation in which a number of protocol layers (here instantiated as modules or capsules) to cooperate between each other in order to deliver new benefits (e.g. improved efficiency, improved capacity or reliability). The flexibility of capsules can be utilized and support capsule grouping due to similarity of function e.g. scheduler related capsules of different RAN stack instances can be instantiated in one module (the same physical or virtual node) in order to assure lowest delays in communication between them in order to achieve low latency scenarios. This way deployment of e.g., three different radio stacks can be performed by considering at same time: i) optimizations regarding the 5G Triangle services (horizontal view), but also ii) particular deployments needs that benefit from cooperation of capsules at certain level (vertical view).

In various examples, a radio access network (RAN) system includes a plurality of capsules that operate in parallel to cooperatively perform RAN stack operations corresponding to a plurality of RAN stacks, each capsule utilizing a processor and a memory configured to perform a corresponding component of the RAN stack operations, wherein the RAN stack operations result in:
communicating backhaul communications with a core communication network;
communicating fronthaul communications with a plurality of radio units configured to engage in wireless communications with a plurality of user equipment (UEs) via a radio channel of a radio network;
converting, in accordance with a communication standard, received fronthaul communications from the plurality of radio units into backhaul communications transmitted to the communications network; and
converting, in accordance with the communication standard, received backhaul communications from the communications network into fronthaul communications.

In addition or in the alternative to any of the foregoing, the RAN includes a plurality if radio units (RUs), and wherein a subset of the plurality of capsules support cooperative scheduling across the plurality of RAN stacks.

In addition or in the alternative to any of the foregoing, the cooperative scheduling includes generating a UE to PRB to RU allocation that associates ones of a plurality of PRBs to selected ones of the plurality of UEs and selected ones of the plurality of RUs.

In addition or in the alternative to any of the foregoing, the subset of the plurality of capsules can be dynamically modified via aggregation and disaggregation to adapt to changing UE to PRB to RU allocations.

In addition or in the alternative to any of the foregoing, a first subset of the plurality of capsules implements first RAN stack operations of a first RAN stack of the plurality of RAN stacks wherein a second subset of the plurality of capsules implements second RAN stack operations of a second RAN stack of the plurality of RAN stacks and wherein the first subset of the plurality of capsules and the second subset of the plurality of capsules are mutually exclusive.

In addition or in the alternative to any of the foregoing, a first capsule of the first subset communicates cross-stack information with a second capsule of the second subset.

In addition or in the alternative to any of the foregoing, the cross-stack information includes information from two or more different planes.

In addition or in the alternative to any of the foregoing, the cross-stack information includes one or more of: metrics, model parameters, key performance indicators or context.

In addition or in the alternative to any of the foregoing, the first capsule of the first subset communicates cross-stack information with the second capsule of the second subset via peer-to-peer communications.

In addition or in the alternative to any of the foregoing, the first capsule of the first subset communicates cross-stack information with the second capsule of the second subset under control of a cross stack mechanism controller.

In addition or in the alternative to any of the foregoing, the first capsule of the first subset implements one of the first RAN stack operations of the first RAN stack and the second capsule of the second subset implements one of the second RAN stack operations of the second RAN stack that is the same as the one of the first RAN stack operations of the first RAN stack.

In addition or in the alternative to any of the foregoing, the first capsule and the second capsule are implemented via a common module.

In addition or in the alternative to any of the foregoing, the first subset of capsules is implemented by a first module under control of a first liquidity controller, wherein the second subset of capsules is implemented by a second module under control of a second liquidity controller.

Figure 6A:
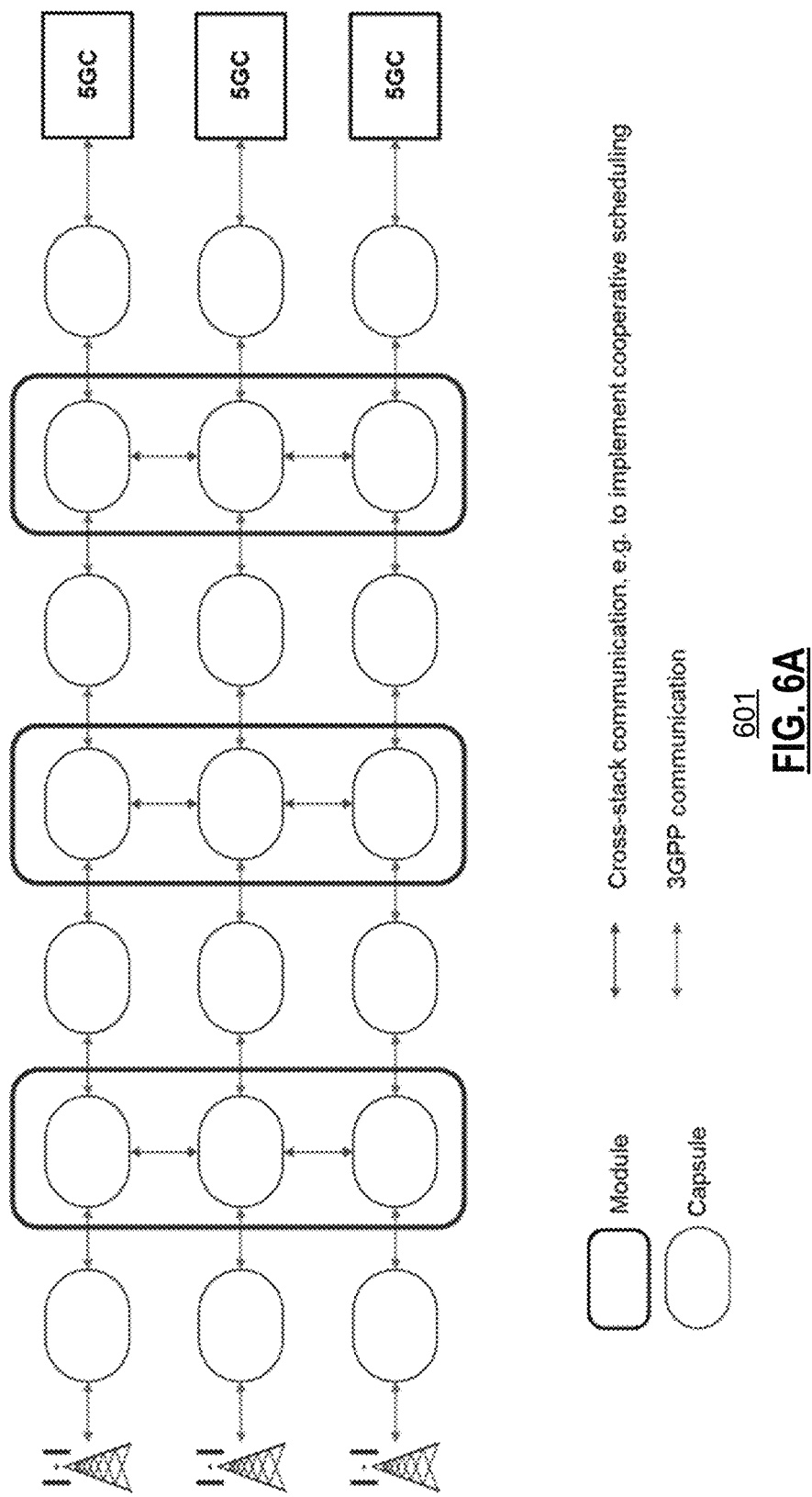

FIG. 6A depicts an example situation 601 in which instances of multiple radio stacks (i.e. one stack represents one cell) would need to exchange information (vertically) in a standardized (or non-standardized) way, in order to achieve some cross-stack improvements e.g. with respect to: efficiency, reliability, security or other perspectives. The proposed building-blocks of the SW-architecture described above, would be able to naturally support such cooperative behaviors with the use of: LC component, appropriately configured modules and a set of capsules.

A particular example would be a cooperative scheduling paradigm that would be useful in a situation where cooperation in resource allocation is assumed among multiple RU. In order to be successfully implemented, it would be desirable to includes a non-standard implementation of a scheduler that is able to control resources belonging to multiple radio units (RU), under control of a single (or multiple) DU. Examples of such techniques for cooperative scheduling are presented in U.S. Patent Publication 2022/0210794 entitled, COOPERATIVE RADIO RESOURCE SCHEDULING IN A WIRELESS COMMUNICATION NETWORK AND METHODS FOR USE THEREWITH, that was published on Jun. 30, 2022, the contents of which are incorporated by reference for any and all purposes. The mechanism utilizes low latency communication between RAN components which contain the scheduler. It can be realized by means of proposed SW architecture where relevant capsules responsible for scheduling are either located in one module (and benefit from in-process communication) or are located in modules interconnected with low latency links and/or being in the vicinity of each other. In various examples and/or embodiments, cooperative scheduling can be then achieved through the communication between relevant capsules which are part of different protocol stacks.

Additional examples and/or embodiments employing the communication of cross-stack information are presented further in conjunction with FIGS. 6B-6G and the description that follows.

These examples allow for customized orchestration of the 5G/6G network functions (e.g. RAN or Core) to improve performance through exchange of information within one or more selected stack layers (can be multiple at the same time) among modules or capsules. These examples address single and especially multiple-stakeholder (e.g. host neutral) 5G/6G deployments to allow their cooperation/aggregation. On various examples, the aim is to enable efficient and controllable horizontal exchange of information (parameters, metadata—e.g. context, learning hyper-parameters) for the networks following the existing and future evolution of functional splits. These examples refer to further evolution of the disaggregated mobile networks (e.g. beyond just the RU/DU/CU splits) towards more loosely-coupled system enhanced with custom interfaces. In particular the various examples are addressing the networks with increasing levels of function disaggregation, beyond the baseline splits of the 5G (e.g. RU, DU, CU). These examples build on top of the architectures with flexible splits and controlled granularity of functional modules packaging, that constitutes the radio stack.

Enabling cooperation among cells (or gNBs) in mobile network leads to a new paradigm which can be called cell-less or cell-free. The resulting use of a centralized resource control and allocation which leverages virtualization and disaggregation of radio stack (5G and beyond), has multiple benefits as it leads to improvements in capacity, energy efficiency and removes the need for handover. Such cooperation requires architectural extensions and enablers on the side of RAN stack that augment the existing specifications of 3GPP. This is achieved among others, by removing the baseline assumption underpinning the cellular networks operation—the competition in the resource allocation. Competition as opposed to cooperation assumes that resources are only "available within a cell" and cell has access to only local resources. The main assumption that enables breaking the barrier of cellular deployments with competitive resource allocation is to use all access points in a form of as a pool of resources. The allocable resources in such pool are: frequency, time and location (of access point or RU).

An example of functionality that already exists and is related to an extent with the distributed/aggregated functions, but as such is not built on top of the capsules-based disaggregated RAN, is the "LWA" (or also Dual Connectivity) and traffic steering (TS). The first and the latter deals with cooperation among two stacks where a) LWA is cooperation between LTE and WiFi stacks after aggregating its functionality into one node and b) TS is the loosely coupled cooperation between different RATs which are not collocated. In contrast to these earlier approaches, various example updates to disaggregated and virtualized RAN architecture that follow the architectural foundations behind cooperative resource allocation (i.e. cooperation at certain radio stack layer), can be generalized and applied to an arbitrary RAN stack protocol layer (e.g. PDCP, RLC, PHY as well as other mechanisms in MAC) or its atomic functions. The proposed modifications of RAN stack architecture address situations where the two or more RAN stacks (5G and beyond) can be set in a way to provide auxiliary communication means to the ones existing today in the 3GPP or ORAN. Various examples described herein focus on highly customizable intra-layer information exchange and cooperation (e.g. CU1-CU2-CUx, MAC1-MAC2-MACx, PTX1-PTX2-PTXn, where PTX denotes power control). Here the main goal is to leverage the capability to enable coexistence and cooperation between either:

1. capsules serving the same or similar function (e.g. scheduling) co-located in the same module, but containing different contexts (e.g. user/cell), or,
2. different stack modules (or functions) in the edge-cloud continuum.

In various examples of disaggregated and virtualized networks, RAN stack modules and capsules can be deployed in the common (i.e. shared) computing space, when the latency/performance requirements between stacks can be matched by appropriately orchestrating the workloads (e.g. in the densified environments with potentially numerous shared computing space). The above will be of particular application in a highly-disaggregated network deployments (ultra-dense networks, swarm-networks, etc.) because in such case there will be higher availability of compute nodes which are relatively "nearby", where "proximity" will be mainly determined by the amount of latency/capacity of the links that connect such nodes.

In an example, cooperating capsules are co-located within the same module. Co-location of capsules serving different users, RUs, cells, etc. in one module is possible due to the polymorphic nature of the module (a module, with the use of Liquidity Controller, can create any functional capsule) as well as have the capability to send (e.g., to share and/or exchange) RAN related contexts across modules. With this capability it is possible to migrate a capsule from one module to another. Once capsules happen to be in one module they can utilize low-latency communication (e.g. via shared memory) for the purpose of cooperation.

In order to implement mechanisms benefiting from cross stack communication (e.g. cell-less paradigm), capsules can communicate directly with each other (in peer-to-peer fashion) or another capsule (a Cross Stack Mechanism Controller) can be created implementing mentioned mechanisms and at the same time communicating with capsules implementing particular protocol stack function. See, e.g., FIG. 6B that provides a diagram 603 of Capsule cooperation: Scenario A-capsules communicating in a Peer-to-Peer fashion; Scenario B-cooperation is controlled by a dedicated capsule "Cross-stack" mechanism controller). The latter capsule can represent a separate capsule or functional extension of the Liquidity Controller (LC).

As an alternative to the two above mentioned options, cooperating capsules within a module can be merged and become one capsule. In this case only the relevant context will be transferred between the modules without spawning new capsules at the module aggregating a function. If capsules are merged, the cross-stack mechanism can be implemented within the capsules or by means of another cross stack mechanism controller. The decision of which approach to choose depends strictly on the implementation process.

Both approaches can be seen as centralization of a particular function. With the difference that this centralization is not inherently embedded into the stack architecture but rather be organized spontaneously if such need arises. Indeed, capsule aggregation and distribution can be performed on demand targeting arbitrary capsules, at run time. It provides an opportunity to build dynamic mechanisms and algorithms which require changing underlying RAN infrastructure on demand. It should also be noted that reverse execution of aggregation approaches in the case of the originally centralized/cooperative approach can lead to distributed processing of originally combined/aggregated functions. In particular, various examples disclosed herein are "reversible" or "two-sided".

Cell-Less Example

Various examples, provides support of cell-less RRM by horizontal aggregation/disaggregation of capsules representing the same functionality-scheduler in particular. Aggregation can alleviate the latency which would be present if scheduler capsules would be separated. See e.g., FIG. 6C which provides a diagram 605 which includes independent schedulers for each RU.

Although cell-less architectures can be realized without capsules and their horizontal aggregation, to achieve dynamic clustering, horizontal function (scheduler) aggregation/disaggregation is needed as an enabler. Capsules implementing a scheduler can be dynamically aggregated/disaggregated to tackle the changing conditions (e.g. UE mobility) See e.g., FIG. 6D which presents a diagram 607 which employs dynamic horizontal aggregation and disaggregation (or more simply "reaggregation") of a scheduler in response to changes in UE to PRB to RU allocation. In this solution, the denser the environment is (in terms of RUs and computing infrastructure) the better our solution works because it takes advantage of the vicinity of capsules whereabouts (if capsules are close it is easier to migrate them and merge). Therefore this solution scales well with the densification of the environment.

In a further example, different stack modules (and their internal stack related capsules) communicate in order to achieve the cooperation between stacks at the layer level. These new capabilities to arise require enabling each module of a RAN (e.g. CU, DU, RIC or a submodule thereof) to utilize a Liquidity Controller (e.g. micro-orchestrator entity) which will be performing a combined role of an orchestrator and a broker (with gateway option). Such an entity plays a major role in a module establishment and configuration. As such can execute a role similar to an ETSI-based of the "element manager"—where an element represents a radio stack "module". But differs from other solutions because the controller enables an exchange of information (e.g. metrics, context, model parameters) with the other peers, i.e. controllers on the same (or another) level but inside other stack(s).

The various examples presented herein enable:
highly-customizable exchange of runtime information between stack layers, modules (or functions) in the "horizontal" dimension (i.e., across stacks). The proposed solution could as well be used to support "vertical" dimension (i.e., between layers of a single radio system).
fast exchange of arbitrary information (metrics, model parameters, KPIs, context, etc.) between any two or more peering modules (or functions) at horizontal layer (e.g. CU, MAC, scheduler, power control) which are co-hosted in the same compute space (e.g. edge server, or K8 pod)·
exchange of information between modules (or functions) of different planes: control plane, data plane, management plane, knowledge (or cognitive) plane
the coordination of such exchange can be managed by various entities e.g. (i) directly by the LC components talking to each other, (ii) in cooperation with RIC (e.g. via dedicated xApp) (ii) under control of a service management and orchestration (SMO) element (e.g. via A1 policy), or (iii) in a less distributed way by introducing a new component i.e. the "Cross-stack Mechanism Controller" as shown in the FIG. 6B which can also be referred to as a Cross-Stack Manager or a Cross-stack manager controller). In the case of SMO here via A1 interface (or equivalent) the new horizontal-module coupling policies can be introduced.

The above-mentioned improvements can be realized based on functional updates presented above, by adapting the functionalities of Liquidity Controller (LC) controller, and/or introducing the "Cross-stack Manager" controller (that can replace or augment selected functions of the Liquidity Controller and/or the Network General Controller discussed herein). Moreover the deployment of additional functions to control and manage the created "new horizontal clusters" can span across RIC and SMO in the ORAN architecture.

Furthermore, from the perspective of managing network stacks with tunable granularity and also composable function aggregation (on a compute node) and function distribution among various compute nodes, it becomes crucial to ensure proper control over what level of information (or data, measurements, etc.) is subject of exchange. Similarly the security assurance (i.e., authorization, authentical and accounting or "AAA") is a consideration especially that the different stacks may belong to various operator (or networks, slices, etc.), where not necessarily all types of information can be feasible for exchange (e.g. exchanging trained model's parameter can be fine, while exchanging traffic profile of users might be too much detailed due to competitive markets). It is possible to activate a security control function (e.g. policy enforcement point) in order to assure security requirements when exchanging information between the module (or function) across the stacks.

Figure 6E:
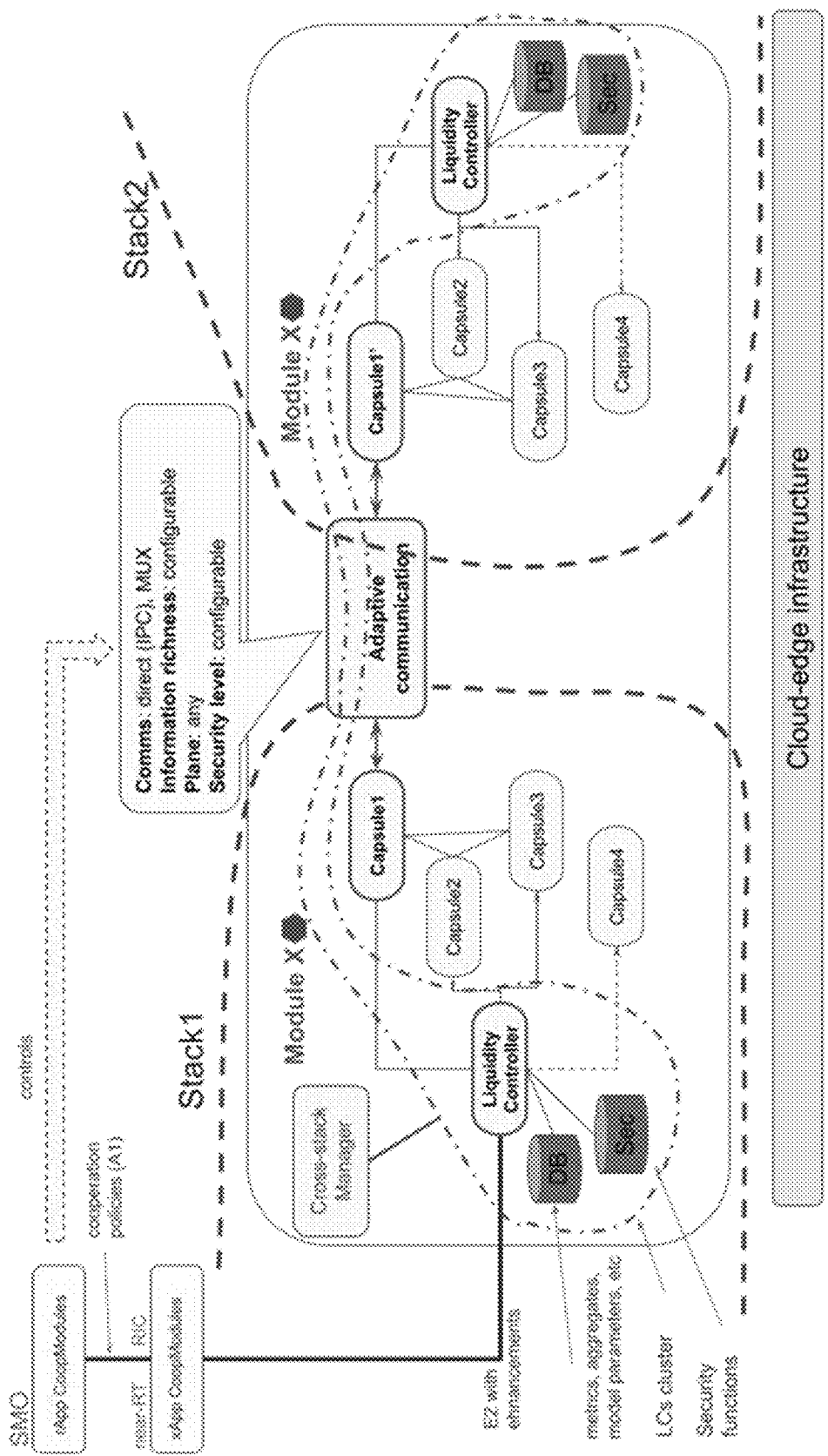

FIG. 6E presents an example of an architecture 609 of the management functions behind the "cross-stack" mechanism. In particular, this example presents example realization of the patent concept by means of management of the "cross-stack" mechanisms with the use of dedicated xApp (CoopModules) and rApp (CoopModules) accompanied by the specific policies on the A1 interface which address control of selected peering capsules (e.g. Capsule1-Capsule1') within ModuleX (e.g. CU). The modules (e.g. ModuleX in FIG. 4) are deployed originally to serve separate stacks (Stack1 and Stack2). However, thanks to the identification of the opportunity to manage selected capsules together (Capsule1-Capsule1') by means of co-deployment in the edge-cloud continuum (using the approach of the patent), the target networks (or slices) can experience multiple benefits. Identifying the opportunity of Modules cooperating (across-stacks) might be the result of either the a) appropriate service request coming to the SMO or b) particular policies coined by the rApps due to certain analytics functions in SMO, or c) any alternative trigger condition. Alternatively the "Cross-stack Manager" can play a role representing the cluster of LCs.

In various examples, the following components can be implemented via or within modules and include the functionality below.

Liquidity Controller
provides shared storage or distributed database (DB) to exchange metrics/aggregates/model parameters (e.g. for dApps)
one may define Information Elements (Information Model) to allow federating information among selected capsules/modules
a cooperating module's horizontal exchange (i.e. for the ModuleX) enables:
controlled security level—i.e. capsules/modules can agree on i.e. secured, raw, aggregated, hyper-parameters data exchange that can be used depending on the requirements of the RIC/SMO
the LCs may exchange information among themselves in various modes (P2P, C-S, broadcast, etc.)
LCs clustering-multiple LCs representing particular module (e.g. CU-UP) can be aggregated into clusters of virtually cooperating modules
a selected LC in a group of cooperating module (or capsule) may serve as E2 termination (of a cluster) to allow external control applications to run at RIC (near or non RT) and use such LC as a single point of contact (for the cluster)
the Liquidity Controller (LC) can be supported by a local AI/ML function that supports its operation (e.g. offering an input/output model), this function can be located in a module or exposed outside (e.g. as xApp)

Cross-Stack Manager (Controller)
this component role can be dedicated to represent the LC cluster as described above; Alternatively such functions as being E2-termination of the LC cluster, managing the cluster (e.g. configuration, operation) can also be distributed by e.g. means of peer-to-peer communication.

RIC
- special E2-extensions dedicated to support "aggregation/distribution" of functions are proposed
  - to allow controlling group(s) of "cooperative modules/capsules" across stacks from a RIC standpoint
    - RIC can use xApp to manage such "aggregations" (create, delete, control) by its own or when controlled by a SMO (i.e. via appropriate A1 policy)
  - number of LCs can create "cluster" which can become "virtual E2 entity" for ease of management (i.e. new type of E2-entity)
  - means for security controls should consider the herein proposed "cooperating modules/capsules" across stacks SMO
- in particular setting with a SMO being the manager of the "cooperative module/capsule" it would define and controls the AAA (authentication, authorization, accounting) of a "cooperative module"—to allow information exchange among selected capsules/LCs in a business oriented fashion
  - various mechanisms of security assurance can be configured
  - the AAA control for "cooperative modules" may be specified and can be provided to RICs via dedicated policies over A1
- specific slicing composition algorithms can be defined to allow achieving multiple optimization criteria for deployment (max QOS, max SEC, max trust, max SEMANTIC, . . . ) for a "cooperative module"
- the particular choice of information exchange among LCs (i.e. modules) can be controlled by SMO policies (or RIC xApps) given the goals of "cooperation"
- selection of particular RUs, DUs, CUs that will be forming "cooperative modules" among the stacks allows cluster formation (i.e. mapping enables flexibility)
- Adaptive Communication—this functional block refers to the multiple communication enablers identified in the Patent009 (e.g. multiplexers, IPC). The role of this block is to identify the multitude of communication options which are available for the "across-stack" horizontal exchange of information. Particular techniques and protocols are subject of selection by the Liquidity Controller or any management node referenced to LC (e.g. orchestrator, RIC, SMO).

Figure 6F:
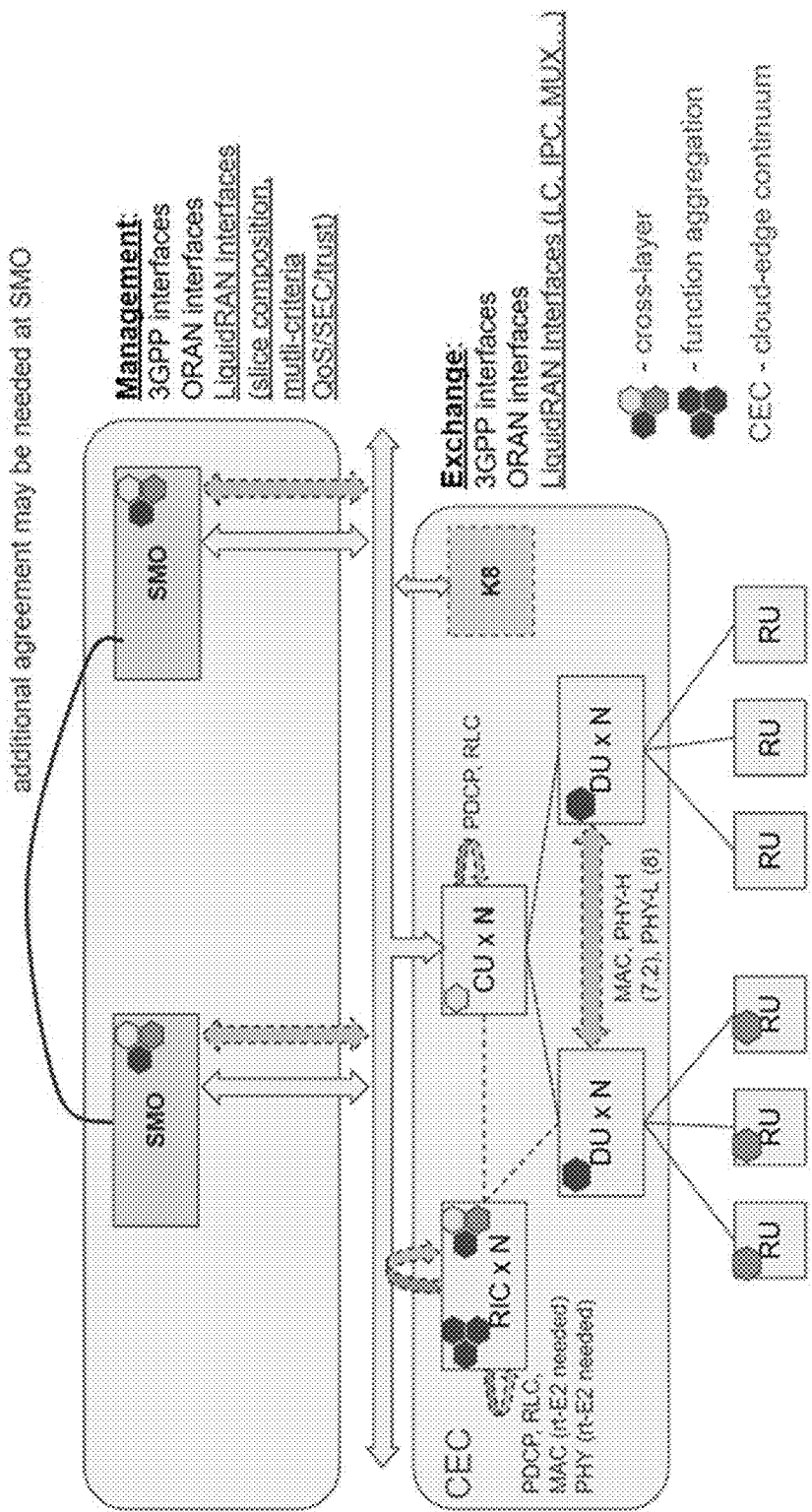

FIG. 6F presents a further example of an architectural solution 611 based on the ORAN network deployment. This example provides an implementation of realization of the horizontal cooperation among modules at multiple 3GPP layers (denoted by green, red and yellow) and multiple network deployments (with separate RIC and SMO for the horizontal cooperation management). This example provides a configuration variant with multiple RIC, multiple SMO available per operator (tenant). Here the SMO can be responsible for managing the composition of "cross-stack capsules/modules", and in turn deliver via A1 policies such a requirement for cooperation that addresses multiple modules (here represented by different colors of the hexagon). Potentially an additional agreement (policy) could be assumed between SMO (i.e. east-west interface) and RICs. However, particular ways of such exchange can be multiple and its particular realization goes beyond the scope of the patent. Still the main information exchanged between stacks' control plane functions (here SMO, RIC) can cover among others: means ensuring trusted interaction (various protocols/interfaces), cross-operator SLA (or its elements e.g. in a shape of policies/rules or intents), security tokens (referring to pre-established or pre-agreed security perimeter parameters), agreed metadata for specify in AI/ML repository or dataspaces configurations (identifying level of exposure for the information levels that operators agree upon) etc.

These examples improve on prior RAN technologies by one or more of the following:
- enabling means of highly-customizable exchange of runtime information between stack layers and modules in the "horizontal" dimension, especially in case of highly-disaggregated network deployments (ultra-dense networks, swarm-networks, etc.)
- granularity of a managed information sharing across stacks down to a capsules cooperation (i.e. pinpointed access to shared information)
- various examples described herein focus on the data-plane but can be generalized to cover enhancement of multiple planes with horizontal cooperation i.e. Management Plane as well as Cognitive Plane for network deployments with the potential (and possibility of) aggregating functions of a single stack layer (or its components)
- novel functional extensions are proposed to the LC, RIC, SMO as well as the new component role is introduced "Cross-Stack Manager"; particular mapping of the proposed extensions to an ORAN/Capsule RAN Stack functions, can be subject to changes.
- capsule cooperation (or module cooperation) among stacks can utilize various means of coordination: a) central manager of the horizontal cluster b) distributed approach to such communication (e.g. peer to peer protocols).

Figure 6G:
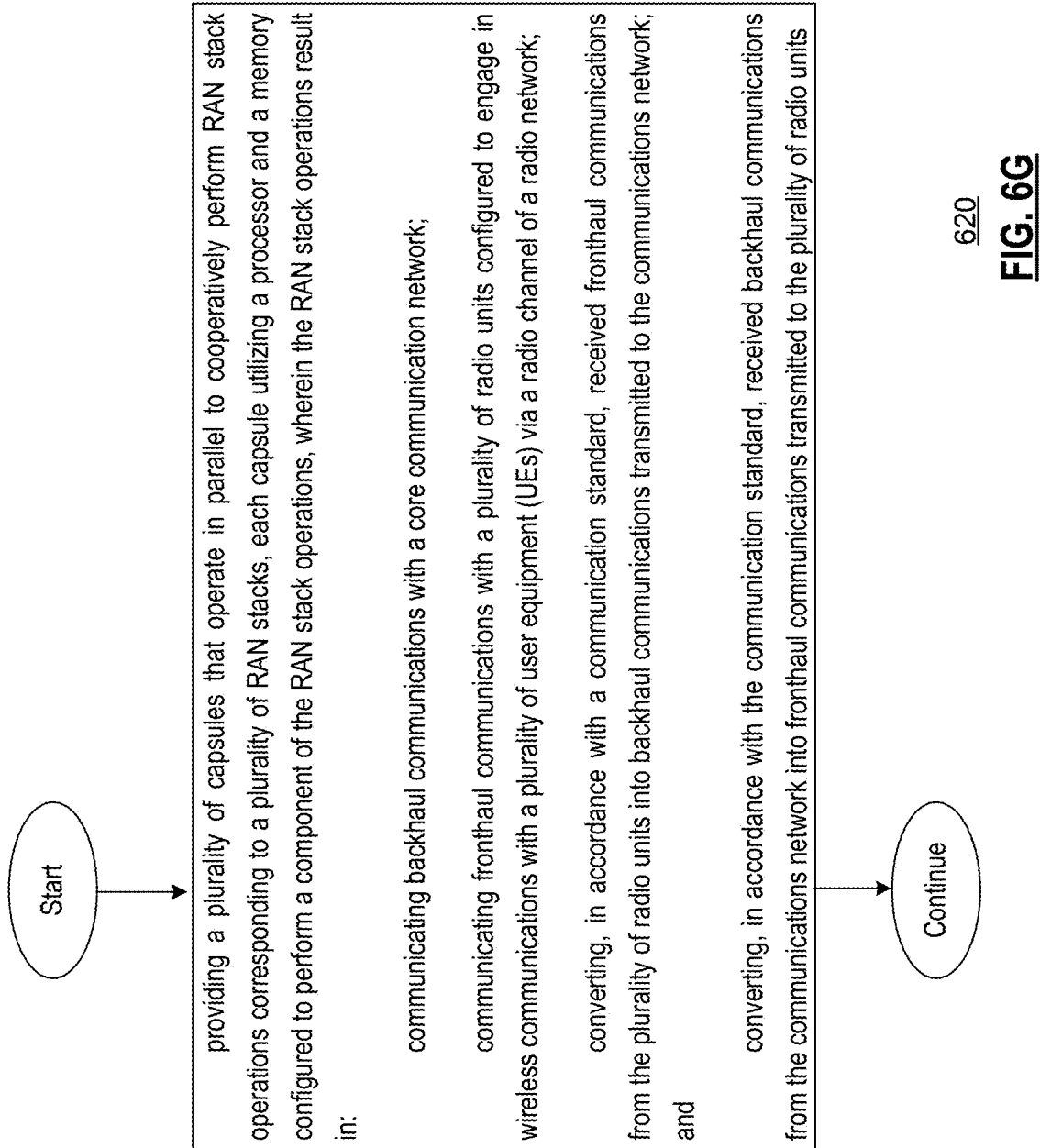
FIG. 6G is a flow diagram illustrating a non-limiting example of a method in accordance with various aspects described herein.

FIG. 6G is a flow diagram illustrating a non-limiting example of a method 620 in accordance with various aspects described herein. In particular, a method is presented for use in conjunction with any of the example architectures, examples, and/or embodiments described previously or in the sections that follow. The method includes providing a plurality of capsules that operate in parallel to cooperatively perform RAN stack operations corresponding to a plurality of RAN stacks, each capsule utilizing a processor and a memory configured to perform a component of the RAN stack operations, wherein the RAN stack operations result in: communicating backhaul communications with a core communication network; communicating fronthaul communications with a plurality of radio units configured to engage in wireless communications with a plurality of user equipment (UEs) via a radio channel of a radio network; converting, in accordance with a communication standard, received fronthaul communications from the plurality of radio units into backhaul communications transmitted to the communications network; and converting, in accordance with the communication standard, received backhaul communications from the communications network into fronthaul communications transmitted to the plurality of radio units.

In addition or in the alternative to any of the foregoing, the RAN includes a plurality if radio units (RUs), and wherein a subset of the plurality of capsules support cooperative scheduling across the plurality of RAN stacks.

In addition or in the alternative to any of the foregoing, the cooperative scheduling includes generating a UE to PRB to RU allocation that associates ones of a plurality of PRBs to selected ones of the plurality of UEs and selected ones of the plurality of RUs.

In addition or in the alternative to any of the foregoing, the subset of the plurality of capsules can be dynamically modified via aggregation and disaggregation to adapt to changing UE to PRB to RU allocations.

In addition or in the alternative to any of the foregoing, a first subset of the plurality of capsules implements first RAN stack operations of a first RAN stack of the plurality of RAN stacks wherein a second subset of the plurality of capsules implements second RAN stack operations of a second RAN stack of the plurality of RAN stacks and wherein the first subset of the plurality of capsules and the second subset of the plurality of capsules are mutually exclusive.

In addition or in the alternative to any of the foregoing, a first capsule of the first subset communicates cross-stack information with a second capsule of the second subset.

In addition or in the alternative to any of the foregoing, the cross-stack information includes information from two or more different planes.

In addition or in the alternative to any of the foregoing, the cross-stack information includes one or more of: metrics, model parameters, key performance indicators or context.

In addition or in the alternative to any of the foregoing, the first capsule of the first subset communicates cross-stack information with the second capsule of the second subset via peer-to-peer communications.

In addition or in the alternative to any of the foregoing, the first capsule of the first subset communicates cross-stack information with the second capsule of the second subset under control of a cross stack mechanism controller.

In addition or in the alternative to any of the foregoing, the first capsule of the first subset implements one of the first RAN stack operations of the first RAN stack and the second capsule of the second subset implements one of the second RAN stack operations of the second RAN stack that is the same as the one of the first RAN stack operations of the first RAN stack.

In addition or in the alternative to any of the foregoing, the first capsule and the second capsule are implemented via a common module.

In addition or in the alternative to any of the foregoing, the first subset of capsules is implemented by a first module under control of a first liquidity controller, wherein the second subset of capsules is implemented by a second module under control of a second liquidity controller.

Example 4: Capsule Migration

With the design provided by the SW architecture disclosed herein, the migration of the functionality between modules is simplified and can be used for a number of overlying mechanisms. The functionality migration process aims at moving capsules (and hence the functionalities capsules represent) between modules (see, e.g., FIG. 7A).

The migration can be performed either in real-time (so called live migration) i.e. without service interruption, or offline where the interruption will occur because of higher latency. The way the migration is performed depends on the nature of the capsule. Migration relies on two mechanisms:
  capsule recreation—removing capsule of focus in one module and recreating it in desired module
  context migration—if necessary context (e.g. state information) can be moved between to-be-removed capsule and newly created instance of that capsule.

In various examples and/or embodiments, migration enables changing the deployment structure of the stack, i.e. the distribution of capsules among modules during the stack run-time. The process can cause down time because of the context transfer between capsules. For some capsules, where live migration can be achieved, down time could be completely eliminated.

In various examples, a radio access network (RAN) system includes capsules that operate in parallel to cooperatively perform RAN stack operations, each capsule utilizing a processor and a memory configured to perform a corresponding component of the RAN stack operations, wherein a first subset of plurality of capsules is implemented by a first module under control of a first liquidity controller, wherein a second subset of capsules is implemented by a second module under control of a second liquidity controller, wherein the first subset of capsules are mutually exclusive of the second subset of capsules, wherein the first liquidity controller and the second liquidity controller cooperate to support a migration of a first capsule from the first subset of capsules to the second subset of capsules, and wherein the RAN stack operations result in:
  communicating backhaul communications with a core communication network;
  communicating fronthaul communications with a plurality of radio units configured to engage in wireless communications with a plurality of user equipment (UEs) via a radio channel of a radio network;
  converting, in accordance with a communication standard, received fronthaul communications from the plurality of radio units into backhaul communications transmitted to the core communications network; and
  converting, in accordance with the communication standard, received backhaul communications from the core communications network into fronthaul communications transmitted to the plurality of radio units.

In addition or in the alternative to any of the foregoing, the migration includes:
  recreating the first capsule as a new first capsule in the second module;
  moving a context to the new first capsule in the second module; and
  removing the first capsule from the first module.

In addition or in the alternative to any of the foregoing, the migration is performed during stack run-time.

In addition or in the alternative to any of the foregoing, the migration is triggered by a fault.

In addition or in the alternative to any of the foregoing, the migration is performed as part of a fault prevention.

In addition or in the alternative to any of the foregoing, the RAN system further includes: a network general controller (NGC) configured to determine an allocation of one or more data flows among the plurality of capsules and a plurality of modules that include the first module and the second module.

In addition or in the alternative to any of the foregoing, the NGC determines the allocation of the one or more data flows, based on module parameters and based on quality of service (QOS) requirements corresponding to one or more data flows, and wherein the allocation includes at least one of:
  adding one or more new capsules to one of the plurality of modules;
  removing one or more of the capsules from one of the plurality of modules;
  deploying a new module to the plurality of modules and migrating one or more of capsules associated with at least one other of the plurality of modules to the new module of the plurality of modules; or idling one of the plurality of modules and migrating one or more of capsules associated with the one of the plurality of modules to at least one other of the plurality of modules.

In addition or in the alternative to any of the foregoing, the module parameters include or more of:
  a module location;
  a module position in a topology;
  a module status; or
  a module load.

In addition or in the alternative to any of the foregoing, the NGC sends allocation data corresponding to the allocation of the one or more data flows to liquidity controllers associated the plurality of modules.

In addition or in the alternative to any of the foregoing, the allocation data includes context to be associated with ones of the capsules.

In addition or in the alternative to any of the foregoing, the allocation of the one or more data flows indicates the migration of the first capsule from the first subset of capsules to the second subset of capsules.

In addition or in the alternative to any of the foregoing, the migration is performed as part of a security mechanism in response to a security attack on the RAN.

In addition or in the alternative to any of the foregoing, the plurality of capsules include a detection capsule configured to monitor network traffic and/or system hardware and to detect the security attack.

In addition or in the alternative to any of the foregoing, the plurality of capsules further include a mitigation capsule configured to mitigate the security attack via one or more protective actions.

Consider the following examples where modules encompass capsules which can exchange RAN context between each other. This context can be slice, UE, bearer context, etc. Another described feature of the module is module polymorphism-a dynamic adaptation of a module. Essentially it is realized by adding or removing capsules which are the carrier of the functionality. The result of this will be that the overall stack functionality within a module can be changed in time. E.g. a module containing MAC and RLC layer capsules can spawn a capsule which conveys PDCP layer, if need arises.

One of the practical embodiments of the module polymorphism and context exchange is a migration process includes capsule creation and respectively removal (module polymorphism) as well as context exchange between modules that can result in a still working stack but with different functional distribution. Referring again to diagram 701 of FIG. 7A—on the left, capsule 1 context migration between modules 1 and 3 and on the right, following capsule 1 removal from module 1, traffic is re-routed to module 3.

It can be noted that, while the example above proposes a capsule migration mechanism which can be used to implement a RAN stack deployment optimization (vertical optimization), in further examples, a broader network perspective (e.g., horizontal deployment optimization), can likewise be considered where deployment of a network (a group of RAN stacks) is taken into consideration in terms of deployment optimization.

Consider that, existing RAN systems (both single RAN as well O-RAN-based) traditionally implement a fixed functionality distribution between RAN components—e.g., the CU, DU, and RU. To accommodate new and ongoing users and related QoS flows/bearers belonging to particular slices in existing networks, two strategies can be selected in traditional RAN deployments:

RAN is preprovisioned—RAN network is dimensioned to carry specific traffic and accommodate specific traffic patterns. Then appropriate computing resources can be provisioned in advance. This solution quickly accommodates new user traffic, however the preprovisioned computing resources might be inadequate to the actual traffic patterns and requirements e.g. the location of computing resources dedicated for the CU component in respect to location DU unit might impose communication delays not suitable for low latency communication.

RAN scales—the premise behind scaling is to provision RAN once user traffic extends current RAN capacity or new user traffic appears with different traffic requirements (e.g. belonging to different slice) then a new instance of one or more RAN components is created to tackle new traffic. This approach alleviates problems present in the preprovisioned RAN, however it adds to additional timing overhead as RAN provisioning introduces additional delay (e.g. minutes when deployed as a pod). It can be important in cases when RAN needs to react quickly e.g. when an end user application (e.g. military robot in z combat zone) desires to modify the QoS profile for its traffic because of sudden operations change. The time needed for the deployment of a new instance of RAN component supporting new QoS might compromise the operational objectives of the application. In addition to the latency, the mere act of creating and deploying new RAN components introduces additional computing overhead, caused by e.g. the orchestrator and the container run-time.

In various examples, the very same mechanisms of module polymorphism and context migration discussed above provide the flexibly to arrange and/or commission appropriate capsules in appropriate modules to support network wise deployment optimization in a near-real time manner (one order faster than deploying the stack elements with the use of virtualization tools) for new traffic (new data flow) as well for the existing traffic which QoS (Quality of Service) requirements have changed (augmented data flow).

Figure 7A:
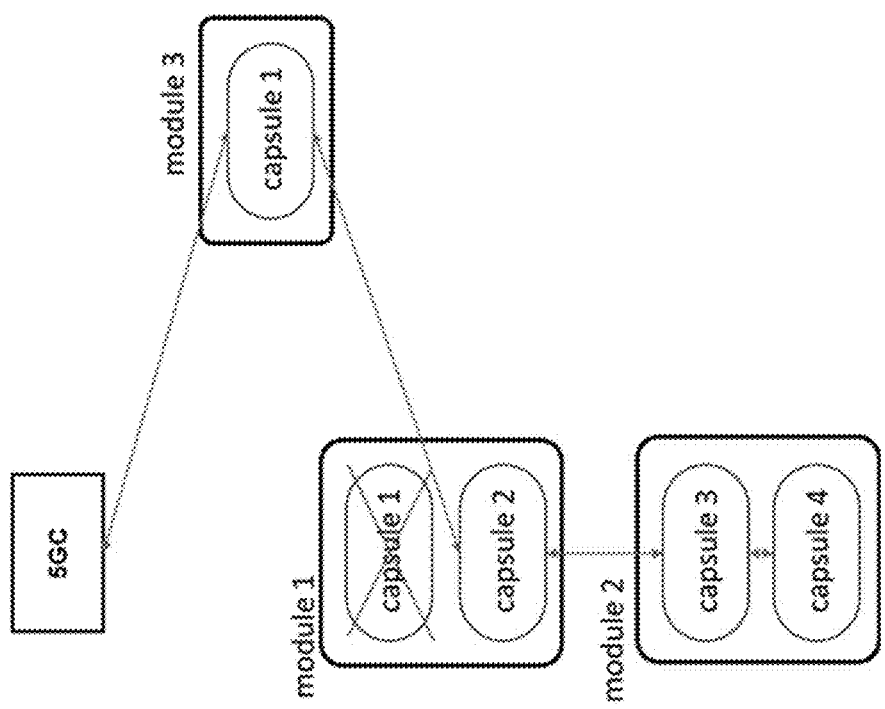
FIG. 7A is a schematic/block diagram illustrating a non-limiting example of capsule migration in accordance with various aspects described herein.
Figure 7A:
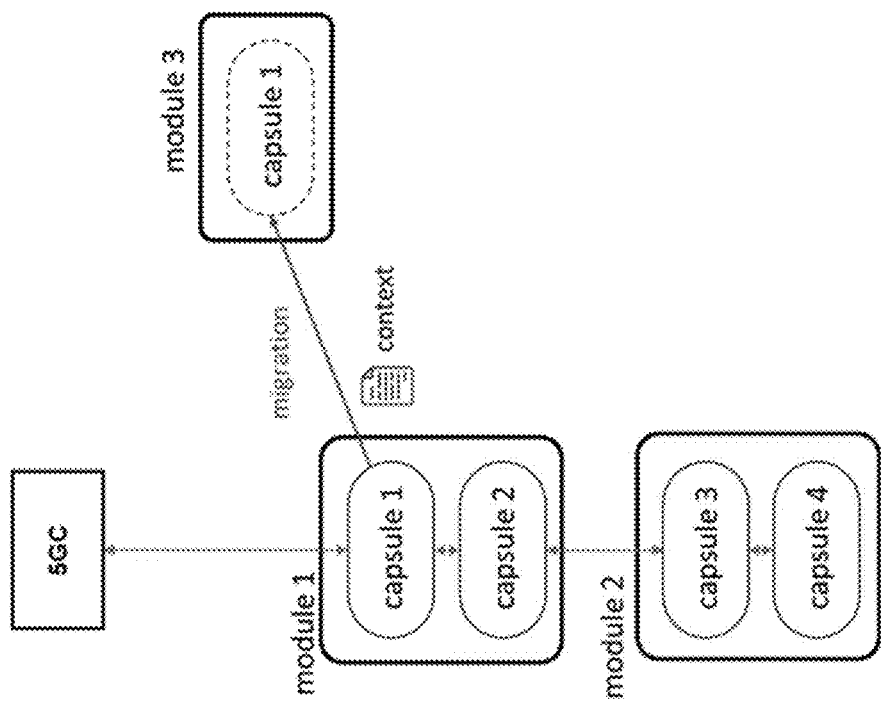
Figure 7B:
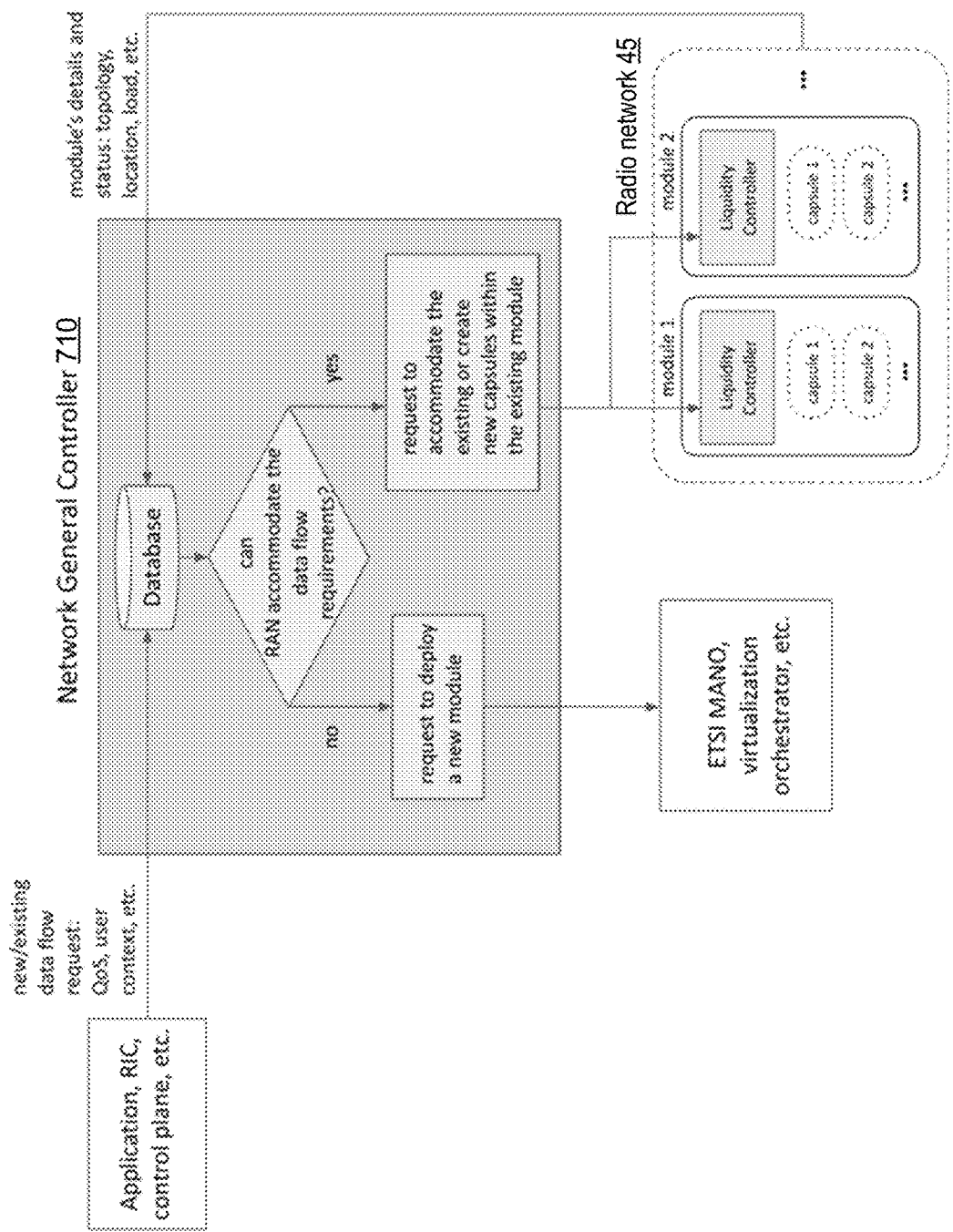
FIG. 7B is a process flow/block diagram illustrating a non-limiting example of a network general controller in accordance with various aspects described herein.

In the example shown in diagram 711 of FIG. 7B, a system for network wide optimization is presented based on optimized allocation the data flow via selection of existing and/or invocation of new capsules or modules. In this example, a Network General Controller (NGC) 710 is provided which, based on the QOS requirements of the data flow and/or other information, instructs RAN modules regarding the optimized allocation of the data flow via selection of existing and/or invocation of new capsules or modules. In various examples, the NGC 710 orchestrates a RAN network (e.g., Radio network 45) but it does not operate on the level of workloads/containers/pods like virtual infrastructure orchestrators (e.g. K8s) but rather on the level of capsules/modules, so as to improve performance via a faster reaction time.

Given a request to adapt to a new or augmentation of existing data flow—coming, for example, from an application, RIC or RAN control plane—the NGC system, having also knowledge of the existing modules, their location, topology, status, load etc., is configured to make a decision whether existing modules can accommodate new or augmented data flow or whether a new module is required. If existing modules of the RAN network can be reused, NGC 710 can send appropriate request(s) to one or more Liquidity Controllers which manage capsules inside the modules to create or reuse a capsule(s) and assign related user/UE/data context (e.g. security information) to it (them).

If existing modules cannot accommodate a data flow (e.g. not enough computing resources or none of modules comply with the latency requirements), the NGC 710 can send a request to the virtual infrastructure orchestration system (ETSI MANO, K8s, etc.) in order to deploy a new instance of the module with proper characteristic (e.g. location). A newly deployed module will be later populated with capsules holding relevant functionality and fed with appropriate user context.

In various examples, when NGC 710 concludes that existing modules can accommodate a data flow (whether new or augmented), the NGC simply requests modules to pass the user context to appropriate capsules. After that step, a data flow is then served by the selected modules/capsules. In this case, existing modules and capsules are reused with no need of creating new instances of them. In the case when transferring an existing data flow to selected capsules is either required or desirable from an optimality perspective, a context migration across modules/capsules can occur. As an alternative, and if deemed suitable, instead of reusing existing capsule(s) a duplicated instance of existing capsule might be invoked within a module but serving the migrated user context.

Consider diagram 721 of FIG. 7C which illustrates the use of module polymorphism for tackling new incoming traffic. In this example, the capsule numberings represent a portion of a RAN stack functionality. On the left a RAN stack implemented by capsules 1-4 is serving data flow A. On the right module 2 was used to instantly create new capsules to serve the new data flow B. In this fashion, when a new data flow B is to be added having QoS requirements e.g. in terms of latency that are not (or cannot be) satisfied by the existing capsule distribution (e.g. for low latency QoS requirements all capsules/modules shall be located at the edge instead of cloud), a process of capsule migration happens—i.e. a new capsules 1 and 2 are created on the fly within existing module 2. In the case of an augmented data flow, context transfer can occur between the original and destination capsules.

In yet another example, if some modules cannot support data flow requirements (e.g., due to distance or latency to the user equipment), NGC 710 requests a virtual infrastructure orchestrator or other network element to deploy a new instance of a module which will satisfy the requirements.

The NGC 710 can be realized by a central controller overlooking modules in the RAN network or in distributed fashion where NGC functionality can be distributed across smaller components and/or modules. In one example NGC can be implemented as an xApp, residing at the RIC (RAN Intelligent Controller) site, which communicates over the E2 interface with every module. For the purpose of this implementation, the E2 interface can be extended to include appropriate information elements serving the purpose of capsule/module handling.

Figure 7E:
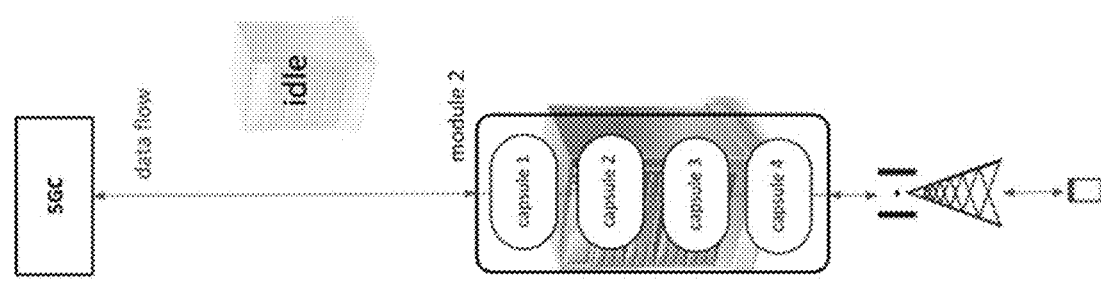
Figure 7E:
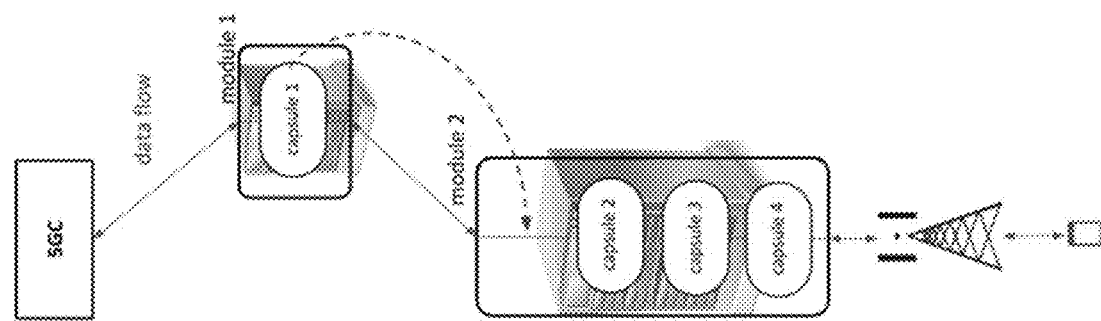

Various examples described herein have the ability for a module to host capsules serving different data flows across different RUs. A module can be considered a tool for network wide optimization because a module is treated as a vessel for capsules which, in some cases, might not constitute a logical flow i.e. capsules might be logically independent serving different data flows. Instead, the logical flow(s) can be established across different modules (see diagram 731 FIG. 7D as an example). In this example, a network topology is illustrated where a module (module 2) serves two data flows. Capsules 1 and 2 and capsules 3 and 4 of module 2 do not constitute a logical flow. As a result the network topology can be created ad-hoc (if needed) and take the form of mesh (connection between modules) rather than single stack or tree topology present in traditional networks. Various examples presented herein improve the technology of RANs as follows:

- The polymorphism of a module together with the transfer of a context can take seconds in comparison to minutes which it would take to perform the redeployment or scaling of the virtualized RAN by traditional means (e.g. K8s),
- In contrast to traditional RAN design with preprovisioned network topology, a stack can be allocated to serve a specific QoS of a data flow in an ad-hoc manner which increases the flexibility of the RAN network,
- The capability of RAN to move small RAN functionalities (capsules) enables network wide optimization (routing optimization, computing resource preservation or energy efficiency, etc.). One of the examples is high utilization of the computing infrastructure as the RAN software can, in cooperation with an orchestrator, fit closely to the available computing resources, given that user QoS requirements are fulfilled in the first place. E.g. RAN software can migrate capsules from some modules to others in order to free up computing nodes which can be moved to idle mode bringing at the same time energy savings (see diagram 741 of FIG. 7E).

FIG. 7F presents a flow chart representation 750 of an example method. This example can be used in conjunction with any of the functions and features of a RAN system for use with a RAN such as radio network 45, described herein. The method can furthermore be used as described with reference to the numerous examples presented in conjunction with FIGS. 7A-7E above.

Step 751-1 includes providing capsules that operate in parallel to cooperatively perform RAN stack operations, each capsule utilizing a processor and a memory configured to perform a component of the RAN stack operations, wherein a first subset of plurality of capsules is implemented by a first module under control of a first liquidity controller, wherein a second subset of capsules is implemented by a second module under control of a second liquidity controller, and wherein the first subset of capsules are mutually exclusive of the second subset of capsules. Step 751-2 includes migrating, via the first liquidity controller and the second liquidity controller, a first capsule from the first subset of capsules to the second subset of capsules.

Step 751-3 includes communicating backhaul communications with a core communication network via the RAN stack operations. Step 751-4 includes communicating fronthaul communications with a plurality of radio units configured to engage in wireless communications with a plurality of user equipment (UEs) via a radio channel of a radio network via the RAN stack operations. Step 751-5 includes converting, in accordance with a communication standard, received fronthaul communications from the plurality of radio units into backhaul communications transmitted to the core communications network via the RAN stack operations.

Step 751-6 includes converting, in accordance with the communication standard, received backhaul communications from the core communications network into fronthaul communications transmitted to the plurality of radio units via the RAN stack operations.

In addition or in the alternative to any of the foregoing, the migration is performed during stack run-time.

In addition or in the alternative to any of the foregoing, the migration is triggered by a fault.

In addition or in the alternative to any of the foregoing, the migration is performed as part of a fault prevention.

In addition or in the alternative to any of the foregoing, the RAN system further includes:
- a network general controller (NGC) configured to determine an allocation of one or more data flows among the plurality of capsules and a plurality of modules that include the first module and the second module.

In addition or in the alternative to any of the foregoing, the NGC determines the allocation of the one or more data flows, based on module parameters and based on quality of service (QOS) requirements corresponding to one or more data flows, and wherein the allocation includes at least one of:
- adding one or more new capsules to one of the plurality of modules;
- removing one or more of the capsules from one of the plurality of modules;
- deploying a new module to the plurality of modules and migrating one or more of capsules associated with at least one other of the plurality of modules to the new module of the plurality of modules; or
- idling one of the plurality of modules and migrating one or more of capsules associated with the one of the plurality of modules to at least one other of the plurality of modules.

In addition or in the alternative to any of the foregoing, the module parameters include or more of:
- a module location;
- a module position in a topology;
- a module status; or
- a module load.

In addition or in the alternative to any of the foregoing, the NGC sends allocation data corresponding to the allocation of the one or more data flows to liquidity controllers associated the plurality of modules.

In addition or in the alternative to any of the foregoing, the allocation data includes context to be associated with ones of the capsules.

In addition or in the alternative to any of the foregoing, the allocation of the one or more data flows indicates the migration of the first capsule from the first subset of capsules to the second subset of capsules.

In addition or in the alternative to any of the foregoing, the migration is performed as part of a security mechanism in response to a security attack on the RAN.

In addition or in the alternative to any of the foregoing, the plurality of capsules include a detection capsule configured to monitor network traffic and/or system hardware and to detect the security attack.

In addition or in the alternative to any of the foregoing, the plurality of capsules further include a mitigation capsule configured to mitigate the security attack via one or more protective actions.

Example 5: Fault Management

In various examples and/or embodiments, fault management can be understood as a mechanism which aims at two main aspects:
- Fault recovery—mechanisms aiming at restoring the correct operation of the software in the face of a defect. A fault may occur due to bad connections between modules or non-working hardware. It can be realized for example by:
  Quick redeployment (e.g. in case of docker based deployment)
  Change of data path
- Fault prevention-preventing failures to happen. One of the methods to do so is adding redundancy to existing network functions.

Figure 8:
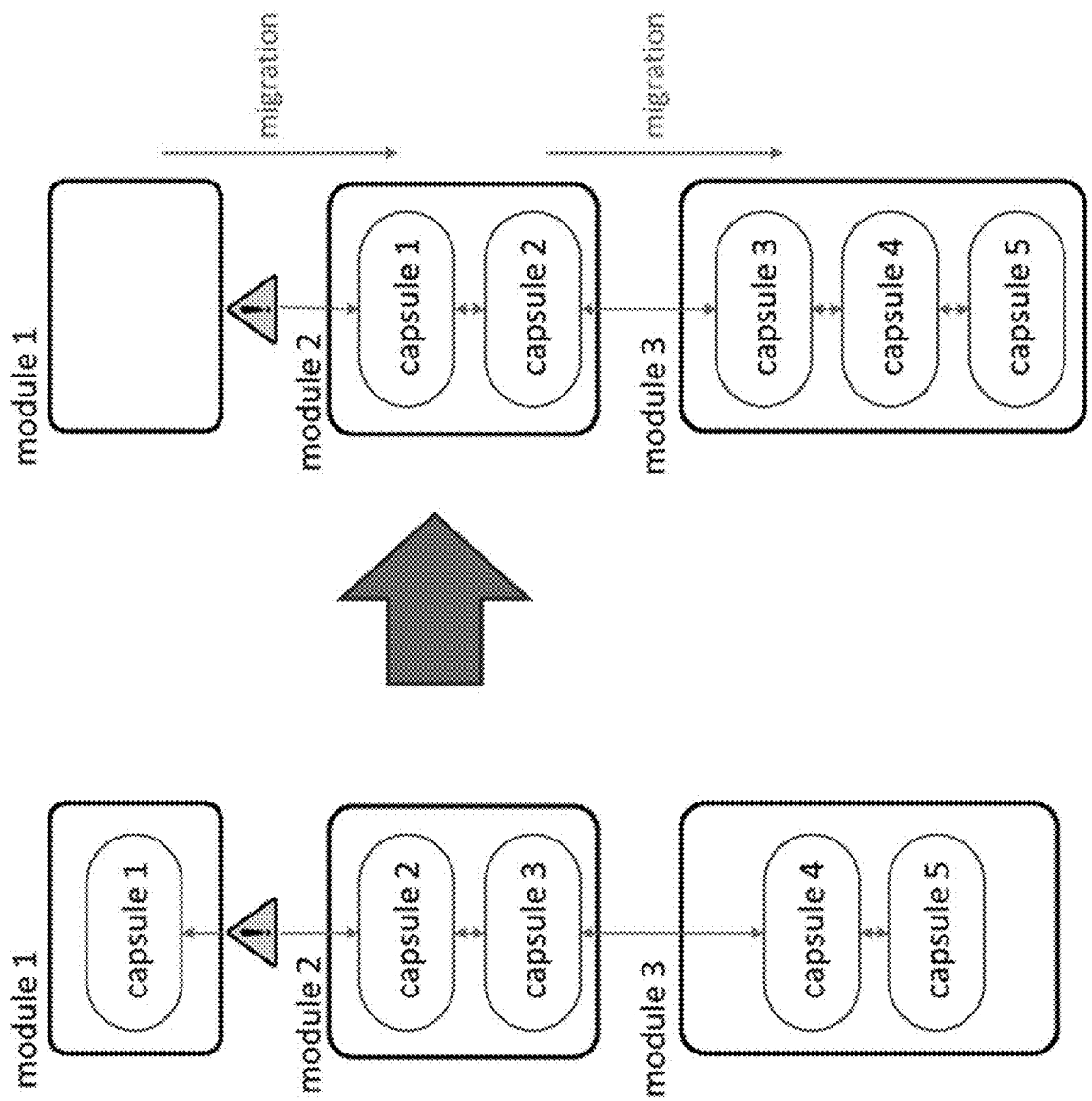
FIG. 8 is a schematic/block diagram illustrating a non-limiting example of fault management in accordance with various aspects described herein.

In various examples and/or embodiments, fault management can take advantage of the migration process. The idea behind is that capsules and their embedded functionality can be moved between modules if one of the modules experiences a malfunction or there is an interrupted connectivity between two modules. In this case capsules from one module can migrate to another one which is deemed safe and has enough computing capacity to accommodate a new capsule. An example of the process in action can be seen in FIG. 8, where a faulty link between two modules 1 and 2 (which can be caused e.g., by high latency or other fault) triggers migration of capsules (here, stack layers) between modules 1 and 2 as well as 2 and 3.

Fault management which relies on stack specific process like migration can presumably take much less time than the typical alternative approach, which is the redeployment of all modules by the external orchestrator (e.g. Kubernetes). The reaction can take milliseconds rather than seconds that would take for an orchestrator to redeploy a module. Moreover, the orchestrator would create a new module and capsules and the context will be lost leading to the RAN down time. Even if the context migration is not possible for certain capsules, respawning capsules in different modules without context migration could potentially be a faster solution to the orchestrator's redeployment of a faulty module.

Example 6: Security: Functionality Evacuation

Another practical application of the capsules and their migration mechanism is a security mechanism which can act upon the threat related to the hardware infrastructure attack (e.g. server) but also software infrastructure attack (e.g. OS). Once the attack is detected, RAN stack functionality (represented by capsules) can be migrated to other modules placed in a different, more secure domain.

Example 7: Security: Detection and Mitigation

Security mechanisms adopted in addition to the application functionality place an additional overhead which can hinder the overall application performance. To mitigate this undesired effect the security approach can rely on capsule architecture in order to minimize the overall footprint of the security mechanisms in terms of the computing resource consumption. Security mechanisms can be present only in the modules which are prone to security attacks (e.g. RRC DDoS attack). Other modules can then work without extra overhead. In such design security functions can be the capsules themselves and be orchestrated by the Liquidity Controller. An example of such security mechanisms can be Detection (DC) and Mitigation (MC) capsules. DC will be monitoring traffic/CPU and detecting attacks. DCs utilize the fact that some attacks are earlier detected at some layers (e.g. signaling attack at the RLC in Acknowledged mode). MC will be addressing RAN availability threats (e.g. DDoS) and network infrastructure attacks which will force protection actions at relevant RAN modules (e.g., dedicating more resources to the affected capsule).

Since, in various examples discussed herein, a RAN system is built from capsules, its security functionalities can also be performed by capsules as outlined above and hereinafter described. In various such examples, security mechanisms can be incorporated in a capsule architecture, with several architectural extensions designed to support operation of such security solutions along with methods for mitigating the cyberattacks which take advantage of the capsule based architecture. In various examples, the RAN systems discussed above can include:

a plurality of capsules that operate in parallel to cooperatively perform RAN stack operations, each capsule utilizing a processor and a memory configured to perform a corresponding component of the RAN stack operations, that plurality of capsules including:
a first subset of capsules implemented by a first module under control of a first liquidity controller; and
a second subset of capsules implemented by a second module under control of a second liquidity controller, wherein the first subset of capsules are mutually exclusive of the second subset of capsules;
wherein the first liquidity controller and the second liquidity controller cooperate to support migration of a first capsule from the first subset of capsules to the second subset of capsules as part of a security mechanism in response to a security attack on the RAN; and
wherein the RAN stack operations result in:
communicating backhaul communications with a core communication network;
communicating fronthaul communications with a plurality of radio units configured to engage in wireless communications with a plurality of user equipment (UEs) via a radio channel of a radio network;
converting, in accordance with a communication standard, received fronthaul communications from the plurality of radio units into backhaul communications transmitted to the core communications network; and
converting, in accordance with the communication standard, received backhaul communications from the core communications network into fronthaul communications transmitted to the plurality of radio units.

In addition or the alternative to any of the foregoing, the plurality of capsules include a detection capsule configured to monitor at least one of: network traffic or system hardware, to detect the security attack.

In addition or the alternative to any of the foregoing, the plurality of capsules include a mitigation capsule configured to mitigate the security attack via one or more protective actions.

In addition or the alternative to any of the foregoing, the plurality of capsules include a security capsule configured to monitor at least one of: network traffic or system hardware, to detect the security attack and to control the migration of the first capsule from the first subset of capsules to the second subset of capsules.

In addition or the alternative to any of the foregoing, the RAN system further includes a security orchestrator also configured to monitor at least one of: network traffic or system hardware, to detect the security attack and to further control the migration of the first capsule from the first subset of capsules to the second subset of capsules.

In addition or the alternative to any of the foregoing, the security orchestrator and the security capsule operate cooperatively to monitor at least one of: network traffic or system hardware, to detect the security attack and to further control the migration of the first capsule from the first subset of capsules to the second subset of capsules.

In addition or the alternative to any of the foregoing, the operations further include: generating a UE to PRB to RU allocation that associates ones of a plurality of PRBs to selected ones of the plurality of UEs and selected ones of a plurality of RUs.

In addition or the alternative to any of the foregoing, the corresponding components of the RAN stack operations performed by two or more of the plurality of capsules is implemented via a single thread.

In addition or the alternative to any of the foregoing, the first liquidity controller controls life cycle management tasks of the first subset of capsules and the second liquidity controller controls life cycle management tasks of the second subset of capsules.

In addition or the alternative to any of the foregoing, the first liquidity controller is configured to selectively add a new capsule to the first subset of capsules and wherein the first liquidity controller is further configured to selectively remove an existing capsule from the first subset of capsules.

In addition or the alternative to any of the foregoing, multiplexers in the first module and the second module support logical links between two or more of the first subset of capsules and two or more of the second subset of capsules.

In addition or the alternative to any of the foregoing, at least one capsule of the first subset of capsules communicates directly with at least one capsule of the second subset of capsules.

In addition or the alternative to any of the foregoing, the migration includes:
recreating the first capsule as a new first capsule in the second module;
moving a context to the new first capsule in the second module; and
removing the first capsule from the first module.

In addition or the alternative to any of the foregoing, the migration is performed during stack run-time.

In addition or the alternative to any of the foregoing, the second liquidity controller is configured to selectively add the first capsule to the second subset of capsules and wherein the first liquidity controller is further configured to selectively remove the first capsule from the first subset of capsules.

In addition or the alternative to any of the foregoing, the first liquidity controller controls life cycle management tasks of the first subset of capsules.

In addition or the alternative to any of the foregoing, the second liquidity controller controls life cycle management tasks of the second subset of capsules.

The examples discussed above and hereinafter address several problems including:
Compromised security in multi-vendor O-RAN environment—5G networks that are built in the Open RAN paradigm broaden the possible attack surface as they integrate software and hardware that enables arranging a network solution coming from different vendors, with open interfaces. The O-RAN network is built by joining different technologies from different providers (multi-vendor networks), often with use of Commercial off-the-shelf (COTS) hardware (e.g. Dell Vostro Servers) and virtualization platforms (e.g. Kubertnetes, Red Hat OpenStack Platform/Red Hat OpenShift, Amazon Web Services) available in the market. All these technologies act without coordination, and are simply superimposed, creating security vulnerabilities.
Global increase in cybersecurity attacks on 5G—Attacks on 5G are on the rise. For example DDoS attacks on the RAN stack have become more widespread due to the 5G networks facilitating the connection of countless smart devices. Each of these devices becomes a potential entry point for malicious actors. Once compromised, these IoT devices can be co-opted into vast botnets, which attackers then use to flood targeted systems with overwhelming traffic, causing widespread disruption.

Increasing security load on system's performance—Cybersecurity solutions often decrease the performance of a system because they require significant computational resources to function effectively. These solutions, such as anti-DDoS systems, firewalls, and encryption tools, continuously monitor system activities, scan files for malicious content, and analyze data traffic for potential threats. This constant vigilance consumes CPU cycles, memory, and storage, which can lead to slower system response times and reduced overall performance, at the end raising the Total Cost of Ownership (TCO). Additionally, the real-time nature of many security processes, like dynamic analysis of executable files or network packet inspection, introduces latency. While these security measures are essential for protecting against cyber threats, they inevitably create a trade-off with system efficiency, as the hardware resources are divided between regular operations and security tasks.

Consider further examples that can be used in addition to in the alternative to any of the examples above wherein the RAN includes two types of cooperating security controllers including: one or more Security Capsules (SC) at the module level and one or more Security Orchestrators (SO) at the network level. Both the Security Capsule and Security Orchestrator have the capability to detect attacks and apply mitigation measures. The SC can detect and mitigate attacks which take advantage of localized RAN software vulnerabilities (e.g. poorly configured network, elevation of privileges, DDoS, lack of patching) while the SO can detect more complex attacks which utilize vulnerabilities across several modules (e.g. DDoS attack on two protocol layers at once). Both the SC and the SO can utilize Detection Capsules (DCs) placed in the modules to monitor anomalous system behavior. After an attack or threat is detected, the system applies mitigation methods. If the mitigation needs to be applied locally, the SC performs the action with the use of a Mitigation Capsule (MC). If a mitigation requires action at the network level, the SO coordinates the procedure.

In low threat situations, the DC and the MC may not be added to the module—reducing the overhead on the network performance caused by security. Moreover, these examples enable faster response by mitigation capsules for the threats at the module level compared to the solutions in RIC/SMO. Also mitigation methodologies using module polymorphism implemented on the network level, can be faster compared to redeployment or scaling of the virtualized RAN by traditional means (e.g. K8s).

Consider the example shown in FIG. 9A where modules of a RAN system 901 implement security using capsules including one or more DC-Detection Capsules, MC-Mitigation Capsules and/or Security Capsules as described below:

Security Capsule (SC)—There may be one security capsule per module that acts as a security capsule controller for that module. Depending on the policy received from the SO, it may act independently or it can react to requests from the the SO. It receives the information from the Security Orchestrator about: the QoS and security requirements of the application or data flow, instructions to deploy/remove the DC and the MC, existing attack signatures and known mitigation methods. It receives information from Detection Capsule(s) about potential anomalies in RAN stack capsules behavior. When acting independently, based on above information, Security Capsule decides: 1) which DC to deploy within the module and requests LC to do it, 2) whether an attack is taking place based on input from the DC and 3) which mitigation action to apply. The mitigation action depends whether it should be applied locally in the module or globally in the network by the SO. If the action should be applied network-wise, it informs the SO. If the action should be applied locally in the module, the SC informs the LC to deploy, remove or migrate relevant capsules. The capsules added for mitigation can either be dedicated Mitigation Capsules with new security functionalities added to RAN, or they may be regular RAN capsules (i.e. those implementing RAN stack) which can be used for threat mitigation (e.g. authorization capsules). A mitigation method may also involve removing a regular RAN capsule which became a source of increased threat (e.g. when a module is migrated from the operator's premises to the public cloud, a capsule exposing user data to other applications may need to be removed). The SC sends the measurements collected by the DCs implemented in the module to the SO for user/application security context storing. If external security management tools are used in the network (e.g. Security Information and Event Management), depending on the policy from SO, the SC may use information about vulnerabilities detected by such systems or make decisions about implementing their recommended mitigation measures.

Detection Capsules (DCs)—There can be different types of Detection Capsules and they are controlled by the SC. Each Detection Capsule monitors one or more specific behavior of other RAN capsules which could be anomalous, and reports it to the Security Capsule. The monitored RAN parameters can be for example: CPU usage, traffic intensity, calls to memory, unauthorized file encryption, privilege escalation or number of signaling messages sent etc. The Detection Capsule can also monitor infrastructure on which the module is running (e.g. Kubernetes pod, operating system) for any integrity breaches. In an alternative implementation, the communication between DC and RAN capsules might be channeled through the LC.

Mitigation Capsules (MCs)—There can be different types of Mitigation Capsules and they are controlled by SC. They perform mitigation actions, which can be applied by changing operation or parameters of the RAN capsules within a module, for example: blocking malicious users, restoring privileges etc. The Mitigation Capsules can be special purpose capsules which perform the actions not performed by standard RAN capsules, for example blocking the user directly without a request from the Core network. In an alternative implementation, the communication between the MC and RAN capsules might be channeled through the LC.

The RAN system shown further includes a Security Orchestrator (SO) 900 configured to govern the behavior of SC via policies as well as performs attack detection and mitigation on the network scale (i.e. across modules). The implementation of such a SO can be realized by a central controller overlooking modules in the RAN network or in distributed fashion where SO functionality can be distributed across smaller components and/or modules. In one example, the SO can be implemented as an xApp, residing at the near-Real Time RIC (RAN Intelligent Controller) site, which communicates over the E2 interface with every module. For the purpose of this implementation, the E2 interface can be extended to include appropriate information elements serving the purpose of capsule/module handling. In another example, the SO may reside in a non-Real Time RIC or SMO (Service Management and Orchestration and Communication) via an O1 interface with the modules (after adding necessary capsule/module handling O1 extensions).

In various examples, the SO consists of the following modules:

Decision Making Component (DMC) 902—Decision making module is the main module of the SO. It makes decisions based on information from: Application, RIC, control plane etc. (about QoS and security requirements of application or data flow), Database 904 (about known attacks and mitigation measures), optionally external security management tools (e.g. Security Information and Event Management), RAN (about existing modules, their location, topology, status, load etc.), SC (security capsules implemented in the module, detection measurements) to determine and perform appropriate actions in the following aspects:

Updating the security policy in SC. The security policy can contain instructions to deploy or remove particular DC or MC, request for particular reports, allow/deny permission to independently make changes to capsules in the module, etc. The security policy can also contain relevant information received from Database of known attacks and mitigation measures, external security management tools (e.g. Security Information and Event Management), and RAN that is necessary to the SC operation.

Network-wise attack detection. DMC recognizes attacks which require coordinated action in several modules while the action of a single module may not be recognized as suspicious from the point of view of SC (e.g. observing increased traffic in RRC and PDCP separately may not indicate a DDoS attack, but does if these observations are combined).

Application of mitigation measures. Mitigation measures in the DMC can either originate from network-wise attack detection or from the request from SC to apply a network-wise mitigation action. Depending on the mitigation measure, DMC either requests SC to perform it if it is achievable on the module level or performs the actions on the network level by itself. The possible network-wise mitigation actions can include the following:

Module polymorphism-capsules of compromised module can be moved to a safe module or the stack can be scaled to address the increased traffic requirements (e.g. in DDoS attack), until the source of attack is identified and neutralized.

Network scaling in a traditional way, i.e. scaling via a request to the virtual infrastructure orchestration system (ETSI MANO, K8s, etc.) in order to deploy a new instance of the module The decision making in the above aspects may be supported by various AI/ML reasoning algorithms. Also, in determining appropriate actions DMC can use predictions about e.g. incoming attacks, increased risks, load of the security functionalities on the RAN, performance of RAN, infrastructure availability etc., which can also be supported by AI/ML. The various AI/ML algorithms used can be, for example Bayesian Networks, Random Forest, Neural Networks, Federated Learning and so on.

DMC may perform optimization of the security functionalities and system performance. The aim can be to balance the performance of RAN and the load of security capsules added to the modules. In such a scenario, the DMC will consider, on the one hand, the risks that appear in RAN and, on the other hand, the performance requirements imposed on the network. The optimization may also be supported with AI/ML.

Database 904—This database can contain, for example, information about common attacks and suggested mitigation measures, e.g. common vulnerabilities and exposures (CVEs) or MITRE. Based on this information SO and SC can apply appropriate DC if there's increased risk of a known attack, as well as appropriate mitigation actions.

Figure 9A:
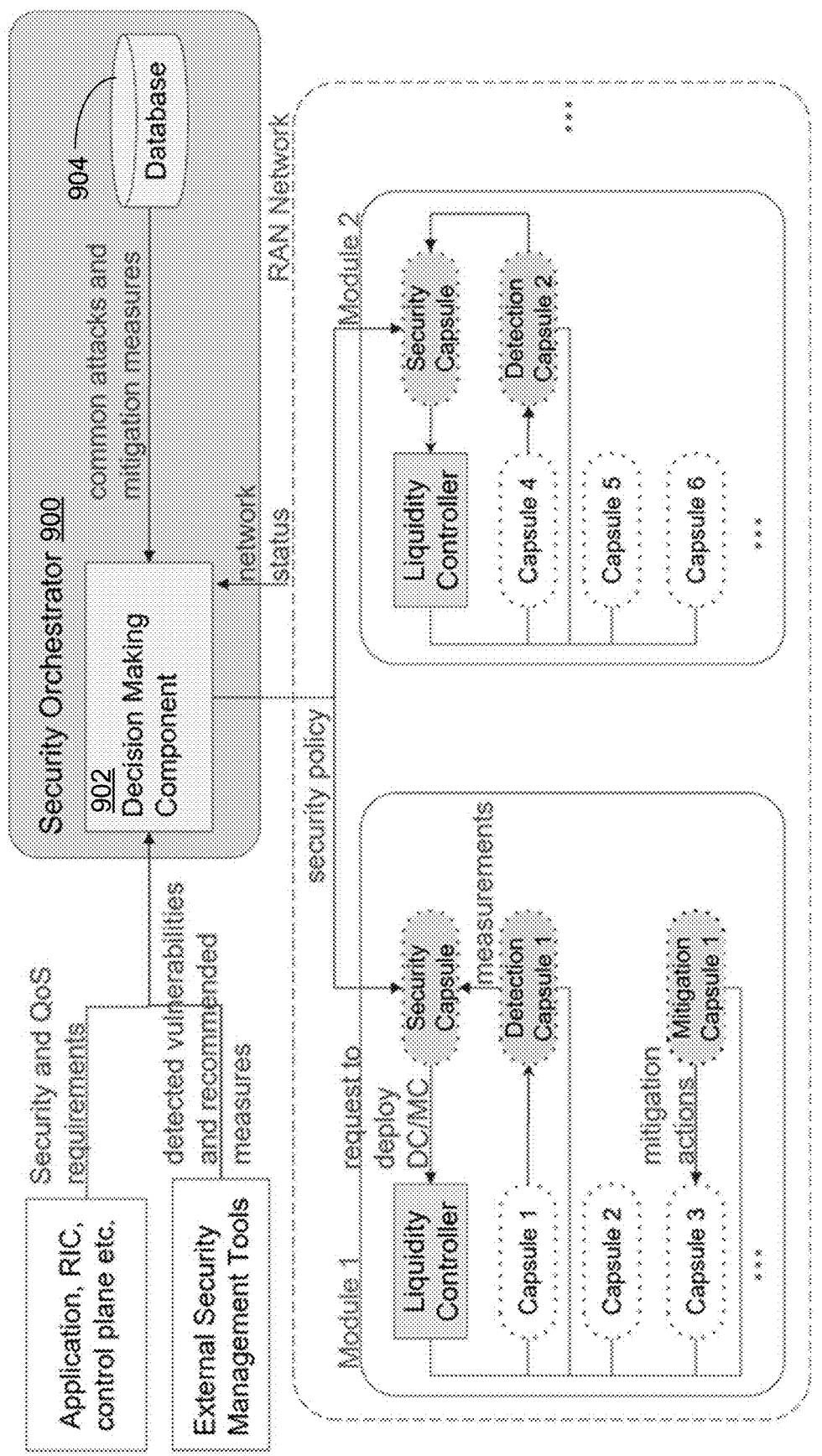
FIGS. 9A-9C are a schematic/block diagrams illustrating non-limiting examples of security detection and mitigation in accordance with various aspects described herein

In the example shown in FIG. 9A, the Liquidity Controller can react to requests from SC to perform:

1. Capsule lifecycle management (creating, configuring, running, reconfiguring, stopping and rerunning capsule instances).
2. Removing or re-instantiating other components within a module e.g. files, databases.
3. Capsule isolation and sandboxing (running a suspicious capsule in an isolated environment without risking harm to the actual system), and providing results of sandboxing to the SC, so that the SC can make a decision about applying an appropriate mitigation action.

Figure 9B:
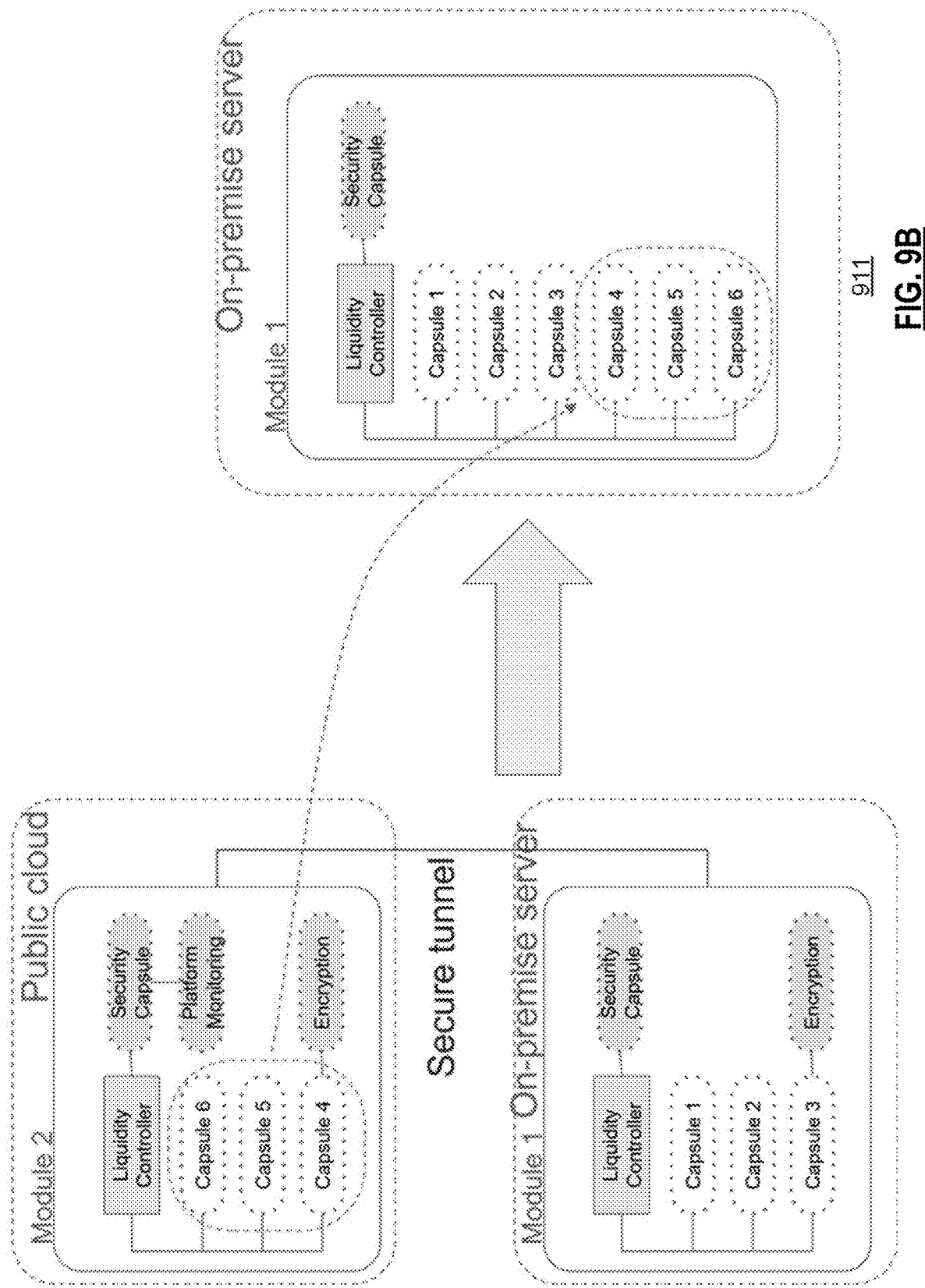

System 911 of FIG. 9B presents an example of applying various examples described herein when an end user application is moved to a safe domain after recognizing increased threat of attack. This example demonstrates a polymorphing of module 2 to the on-premise server after a threat is detected in the cloud. In this case, on-premise monitoring and encryption through secure tunnel may no longer be needed.

Consider the case where such applications may initially be running in a public cloud (e.g. due to low cost) and constantly monitoring the integrity of the underlying infrastructure (e.g. for open ports, running services, or vulnerable software versions) via DC for potential threat. Once a threat is detected, the SO may make a decision to move the capsules from the affected module to the on-premise server, which is more secure due to its location. In this situation some of the security functionalities may be safely removed, for example the operator may choose to not encrypt traffic (e.g. via IPSEC tunnel) inside its Network Domain. This solution allows for faster removal of these functionalities than when redeploying the whole module via virtual infrastructure orchestrators (e.g. K8s). It also enables equally fast addition of needed security functionalities once the operator decides to return the module to the public cloud (e.g. when the public cloud's vulnerability has been patched by its operator).

Figure 9C:
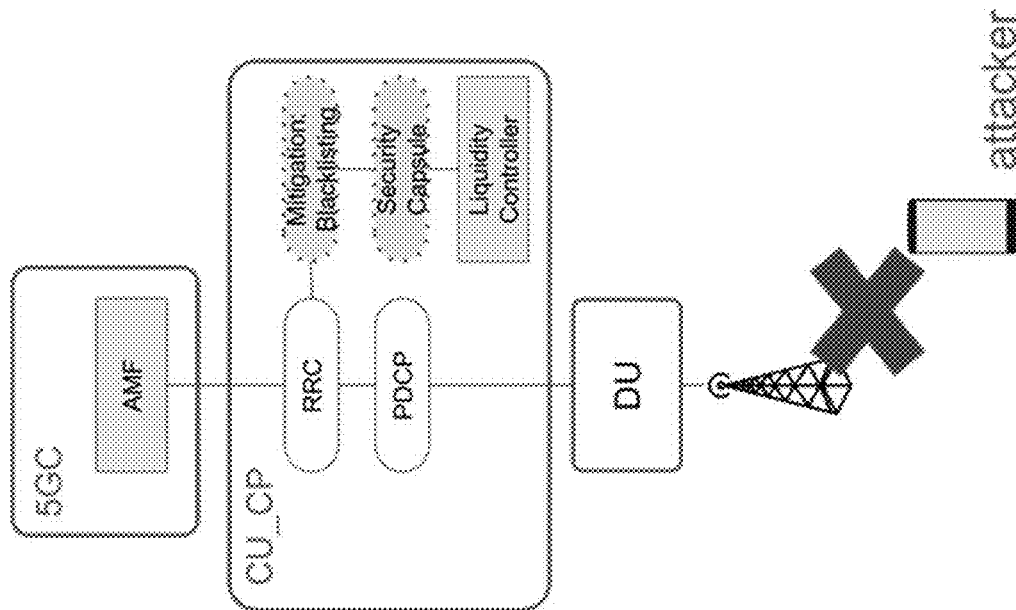
Figure 9C:
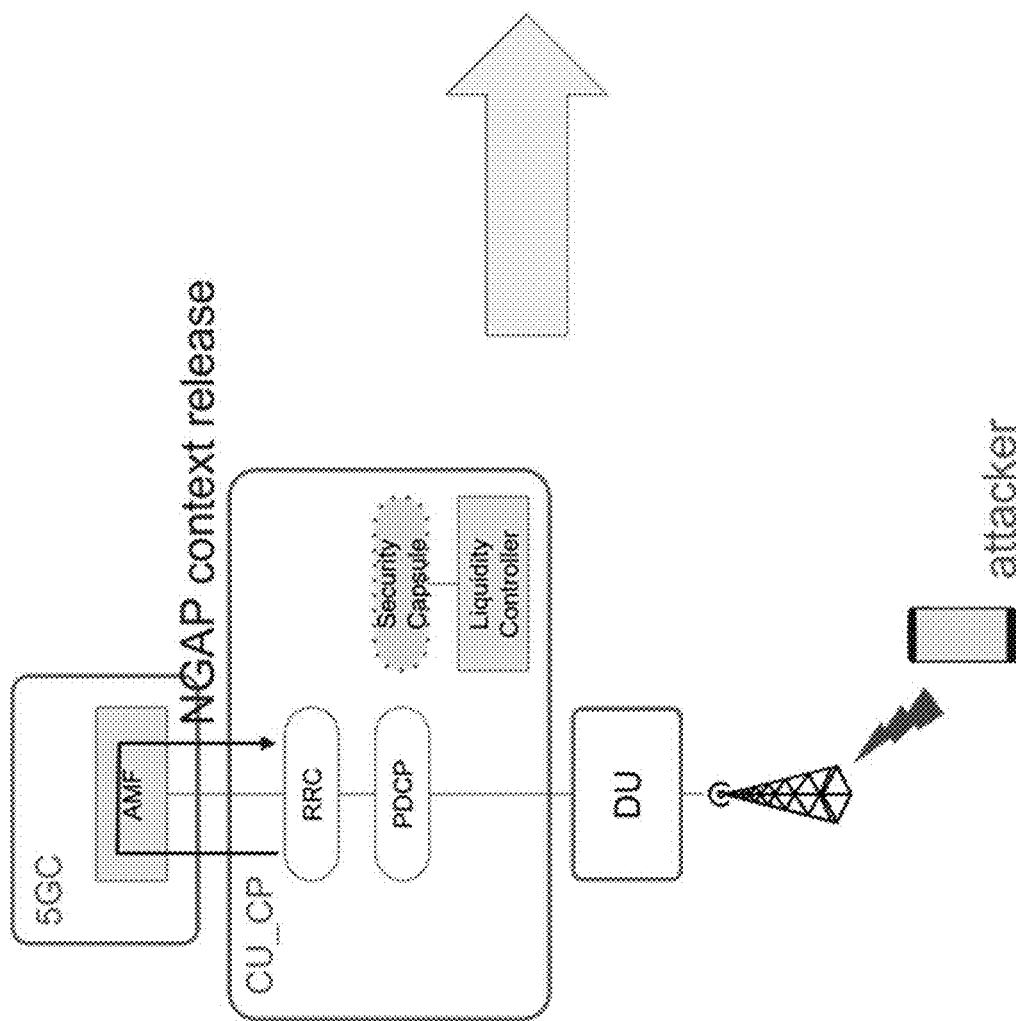

System 921 of FIG. 9C presents an example of DDoS instant mitigation. Currently, the problem with many solutions to DDoS attacks through the radio interface is that any decision to permanently remove the malicious traffic and block the responsible user can go through the Core network, making the solution slow. For example: during an RRC signaling attack, the affected CU before performing RRC release has to go through NGAP context release procedure with AMF to stop serving the malicious user. Moreover, once the user temporarily disconnects from the network or changes the serving base station, they will be able to reconnect as there's no mechanism to blacklist them in RAN. In various examples described herein, instant traffic removal as well as permanent attacker blocking may be done in RAN. Instead of the NGAP context release procedure, the SC can deploy a MC in the module whose role is to deny any RRC traffic from a given user before it is processed by upper layers. Moreover the SC blacklists the user so that it is blocked even after reconnecting to the network or changing the serving base station.

The various examples presented herein improve the technology of RAN systems by providing:

- Improved reaction speed—The speed increase in mitigation actions is twofold. First, for some localized attacks/threats SC can apply mitigation without going through a central controller or Core network which enables real time reaction. Second, for those type of threat mitigation that require migration or scaling on the network level, various examples enable use of module polymorphing (described in Capsule Migration Patent extension to Patent 009) which is near-real time in comparison to non-real time redeployment or scaling of the virtualized RAN by traditional means (e.g. K8s).
- Resource saving—Detection and Mitigation Capsules are applied at the module level as needed, decreasing the load on the computational resource and storage.
- Flexibility—The security features can be applied and removed to a data flow in an ad-hoc manner, depending on the changing requirements and the security of the environment.
- Scalability—The solution will scale better than traditional security tools because the detection and mitigation can be tailored to the changing module requirements without any necessary components that are present in a monolith security solution. In the worst case scenario, i.e. when all the security functions have to be deployed in a module for the whole lifetime of application as it would be in a monolith security, the resource footprint will be comparable to the monolith solution.

FIG. 9D presents a flow chart representation 950 of an example method. This example can be used in conjunction with any of the functions and features of a RAN system for use with a RAN such as radio network 45, described herein. The method can furthermore be used as described with reference to the numerous examples presented in conjunction with FIGS. 9A-9C above.

Step 951-1 includes providing capsules that operate in parallel to cooperatively perform RAN stack operations, each capsule utilizing a processor and a memory configured to perform a component of the RAN stack operations, wherein a first subset of plurality of capsules is implemented by a first module under control of a first liquidity controller, wherein a second subset of capsules is implemented by a second module under control of a second liquidity controller, and wherein the first subset of capsules are mutually exclusive of the second subset of capsules. Step 951-2 includes migrating, via the first liquidity controller and the second liquidity controller, a first capsule from the first subset of capsules to the second subset of capsules as part of a security mechanism in response to a security attack on the RAN Step 951-3 includes communicating backhaul communications with a core communication network via the RAN stack operations. Step 951-4 includes communicating fronthaul communications with a plurality of radio units configured to engage in wireless communications with a plurality of user equipment (UEs) via a radio channel of a radio network via the RAN stack operations. Step 951-5 includes converting, in accordance with a communication standard, received fronthaul communications from the plurality of radio units into backhaul communications transmitted to the core communications network via the RAN stack operations. Step 951-6 includes converting, in accordance with the communication standard, received backhaul communications from the core communications network into fronthaul communications transmitted to the plurality of radio units via the RAN stack operations.

In addition or the alternative to any of the foregoing, the plurality of capsules include a detection capsule configured to monitor at least one of: network traffic or system hardware, to detect the security attack.

In addition or the alternative to any of the foregoing, the plurality of capsules include a mitigation capsule configured to mitigate the security attack via one or more protective actions.

In addition or the alternative to any of the foregoing, the plurality of capsules include a security capsule configured to monitor at least one of: network traffic or system hardware, to detect the security attack and to control the migration of the first capsule from the first subset of capsules to the second subset of capsules.

In addition or the alternative to any of the foregoing, the RAN system further includes a security orchestrator also configured to monitor at least one of: network traffic or system hardware, to detect the security attack and to further control the migration of the first capsule from the first subset of capsules to the second subset of capsules.

In addition or the alternative to any of the foregoing, the security orchestrator and the security capsule operate cooperatively to monitor at least one of: network traffic or system hardware, to detect the security attack and to further control the migration of the first capsule from the first subset of capsules to the second subset of capsules.

In addition or the alternative to any of the foregoing, the operations further include: generating a UE to PRB to RU allocation that associates ones of a plurality of PRBs to selected ones of the plurality of UEs and selected ones of a plurality of RUs.

In addition or the alternative to any of the foregoing, the corresponding components of the RAN stack operations performed by two or more of the plurality of capsules is implemented via a single thread.

In addition or the alternative to any of the foregoing, the first liquidity controller controls life cycle management tasks of the first subset of capsules and the second liquidity controller controls life cycle management tasks of the second subset of capsules.

In addition or the alternative to any of the foregoing, the first liquidity controller is configured to selectively add a new capsule to the first subset of capsules and wherein the first liquidity controller is further configured to selectively remove an existing capsule from the first subset of capsules.

In addition or the alternative to any of the foregoing, multiplexers in the first module and the second module support logical links between two or more of the first subset of capsules and two or more of the second subset of capsules.

In addition or the alternative to any of the foregoing, at least one capsule of the first subset of capsules communicates directly with at least one capsule of the second subset of capsules.

In addition or the alternative to any of the foregoing, the migration includes:

recreating the first capsule as a new first capsule in the second module;
moving a context to the new first capsule in the second module; and
removing the first capsule from the first module.

In addition or the alternative to any of the foregoing, the migration is performed during stack run-time.

In addition or the alternative to any of the foregoing, the second liquidity controller is configured to selectively add the first capsule to the second subset of capsules and wherein the first liquidity controller is further configured to selectively remove the first capsule from the first subset of capsules.

In addition or the alternative to any of the foregoing, the first liquidity controller controls life cycle management tasks of the first subset of capsules.

In addition or the alternative to any of the foregoing, the second liquidity controller controls life cycle management tasks of the second subset of capsules.

As used herein, the terms proposed solutions, solutions, and examples refer to the many different combinations of features disclosed herein that include one or more unique features or one or more unique combinations of features.

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. The processing module, module, processing circuit, processing circuitry, and/or processing unit can further include one or more interface devices for communicating data, signals and/or other information between the components of the processing module and further for communicating with other devices. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in the form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A radio access network (RAN) system comprises:
capsules that operate in parallel to cooperatively perform RAN stack operations, each capsule utilizing a processor and a memory configured to perform a corresponding component of the RAN stack operations, wherein a first subset of plurality of capsules is implemented by a first module under control of a first liquidity controller, wherein a second subset of capsules is implemented by a second module under control of a second liquidity controller, wherein the first subset of capsules are mutually exclusive of the second subset of capsules, wherein the first liquidity controller and the second liquidity controller cooperate to support a migration of a first capsule from the first subset of capsules to the second subset of capsules, and wherein the RAN stack operations result in:
communicating backhaul communications with a core communication network;
communicating fronthaul communications with a plurality of radio units configured to engage in wireless communications with a plurality of user equipment (UEs) via a radio channel of a radio network;
converting, in accordance with a communication standard, received fronthaul communications from the plurality of radio units into backhaul communications transmitted to the core communication network; and
converting, in accordance with the communication standard, received backhaul communications from the core communication network into fronthaul communications transmitted to the plurality of radio units.

2. The RAN system of claim 1, wherein the migration includes: recreating the first capsule as a new first capsule in the second module;
moving a context to the new first capsule in the second module; and removing the first capsule from the first module.

3. The RAN system of claim 1, wherein the migration is performed during stack run-time.

4. The RAN system of claim 1, wherein the migration is triggered by a fault.

5. The RAN system of claim 1, wherein the migration is performed as part of a fault prevention.

6. The RAN system of claim 1, further comprising:
a network general controller (NGC) configured to determine an allocation of one or more data flows among the plurality of capsules and a plurality of modules that include the first module and the second module.

7. The RAN system of claim 6, wherein the NGC determines the allocation of the one or more data flows, based on module parameters and based on quality of service (QOS) requirements corresponding to one or more data flows, and wherein the allocation includes at least one of:
adding one or more new capsules to one of the plurality of modules; removing one or more of the capsules from one of the plurality of modules;
deploying a new module to the plurality of modules and migrating one or more of capsules associated with at least one other of the plurality of modules to the new module of the plurality of modules; or
idling one of the plurality of modules and migrating one or more of capsules associated with the one of the plurality of modules to at least one other of the plurality of modules.

8. The RAN system of claim 7, wherein the module parameters include one or more of:
a module location;
a module position in a topology; a module status; or
a module load.

9. The RAN system of claim 6, wherein the NGC sends allocation data corresponding to the allocation of the one or more data flows to liquidity controllers associated with the plurality of modules.

10. The RAN system of claim 9, wherein the allocation data includes context to be associated with ones of the capsules.

11. The RAN system of claim 6, wherein the allocation of the one or more data flows indicates the migration of the first capsule from the first subset of capsules to the second subset of capsules.

12. The RAN system of claim 1, wherein the migration is performed as part of a security mechanism in response to a security attack on the RAN system.

13. The RAN system of claim 12, wherein the plurality of capsules include a detection capsule configured to monitor network traffic and/or system hardware and to detect the security attack.

14. The RAN system of claim 12, wherein the plurality of capsules further include a mitigation capsule configured to mitigate the security attack via one or more protective actions.

15. A method for use in a radio access network (RAN) comprises:
providing capsules that operate in parallel to cooperatively perform RAN stack operations, each capsule utilizing a processor and a memory configured to perform a component of the RAN stack operations, wherein a first subset of plurality of capsules is implemented by a first module under control of a first liquidity controller, wherein a second subset of capsules is implemented by a second module under control of a second liquidity controller, and wherein the first subset of capsules are mutually exclusive of the second subset of capsules;
migrating, via the first liquidity controller and the second liquidity controller, a first capsule from the first subset of capsules to the second subset of capsules;
communicating backhaul communications with a core communication network via the RAN stack operations;
communicating fronthaul communications with a plurality of radio units configured to engage in wireless communications with a plurality of user equipment (UEs) via a radio channel of a radio network via the RAN stack operations;
converting, in accordance with a communication standard, received fronthaul communications from the plurality of radio units into backhaul communications transmitted to the core communications network via the RAN stack operations; and
converting, in accordance with the communication standard, received backhaul communications from the core communications network into fronthaul communications transmitted to the plurality of radio units via the RAN stack operations.

16. The method of claim 15, wherein the migration includes:
recreating the first capsule as a new first capsule in the second module;
moving a context to the new first capsule in the second module; and
removing the first capsule from the first module.

17. The method of claim 15, further comprising:
determining, via a network general controller (NGC), an allocation of one or more data flows among the plurality of capsules and a plurality of modules that include the first module and the second module.

18. The method of claim 17, wherein the NGC determines the allocation of the one or more data flows, based on module parameters and based on quality of service (QOS) requirements corresponding to one or more data flows, and wherein the allocation includes at least one of:
adding one or more new capsules to one of the plurality of modules;
removing one or more of the capsules from one of the plurality of modules;
deploying a new module to the plurality of modules and migrating one or more of capsules associated with at least one other of the plurality of modules to the new module of the plurality of modules; or
idling one of the plurality of modules and migrating one or more of capsules associated with the one of the plurality of modules to at least one other of the plurality of modules.

19. The method of claim 18, wherein the module parameters include one or more of:
a module location;
a module position in a topology;
a module status; or
a module load.

20. The method of claim 17, wherein the NGC sends allocation data corresponding to the allocation of the one or more data flows to liquidity controllers associated with the plurality of modules.

* * * * *